United States Patent
Shilane et al.

(10) Patent No.: US 12,050,549 B2
(45) Date of Patent: Jul. 30, 2024

(54) CLIENT SUPPORT OF MULTIPLE FINGERPRINT FORMATS FOR DATA FILE SEGMENTS

(71) Applicant: Dell Products L.P., Round Rock, TX (US)

(72) Inventors: Philip Shilane, Newtown (PA); Abhinav Duggal, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 103 days.

(21) Appl. No.: 17/848,733

(22) Filed: Jun. 24, 2022

(65) Prior Publication Data

US 2023/0376451 A1 Nov. 23, 2023

Related U.S. Application Data

(63) Continuation-in-part of application No. 17/749,336, filed on May 20, 2022.

(51) Int. Cl.
*G06F 16/00* (2019.01)
*G06F 11/14* (2006.01)
*G06F 16/11* (2019.01)

(52) U.S. Cl.
CPC ........ *G06F 16/116* (2019.01); *G06F 11/1453* (2013.01); *G06F 11/1464* (2013.01); *G06F 2201/84* (2013.01)

(58) Field of Classification Search
CPC ............... G06F 16/116; G06F 11/1453; G06F 11/1464; G06F 2201/84
See application file for complete search history.

(56) References Cited

U.S. PATENT DOCUMENTS

| 11,593,332 B1 | 2/2023 | Shilane et al. | |
|---|---|---|---|
| 2010/0198783 A1* | 8/2010 | Wang | G06F 16/80 707/610 |
| 2016/0041777 A1 | 2/2016 | Tripathy et al. | |

* cited by examiner

*Primary Examiner* — Tyler J Torgrimson
(74) *Attorney, Agent, or Firm* — Dergosits & Noah LLP; Todd A. Noah

(57) ABSTRACT

If a client is configured to create fingerprints for data file segments, the configured client identifies any format specified for fingerprints created by the configured client, and identifies fingerprint formats, including a first fingerprint format and/or a second fingerprint format, supported by a backup server associated with the configured client. If the fingerprint formats supported by the backup server includes any format specified for fingerprints created by the configured client, the configured client partitions the backup server to store fingerprints created by the configured client. The configured client creates fingerprints for segments of a data file identified for backup, and sends the created fingerprints to the configured backup server. The configured client identifies a request from the configured backup server for a segment, of the data file, which corresponds to a non-duplicate fingerprint; and sends the requested segment to the configured backup server, which stores the requested segment.

20 Claims, 10 Drawing Sheets

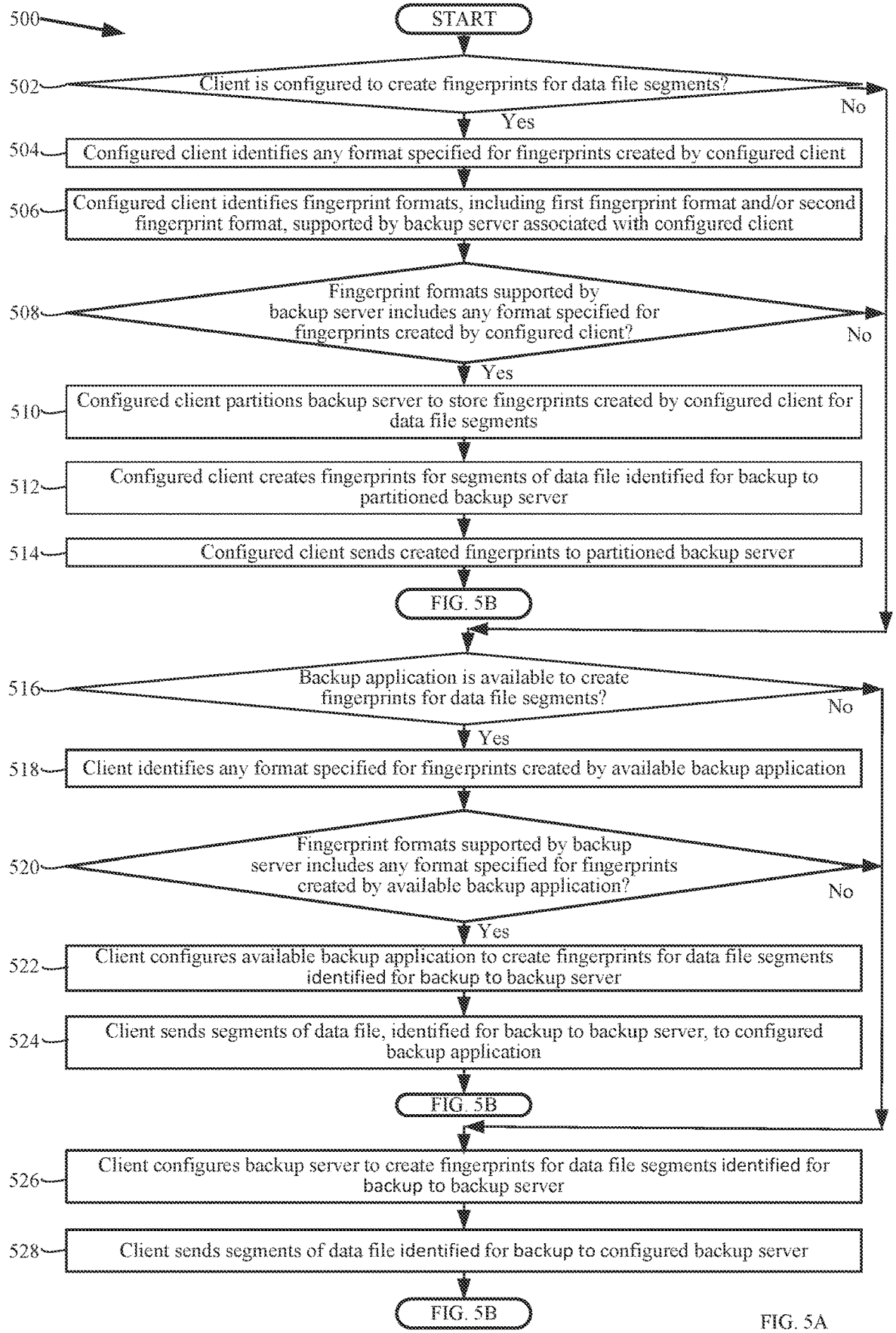

CLIENT SUPPORT OF MULTIPLE FINGERPRINT FORMATS FOR DATA FILE SEGMENTS

CROSS-REFERENCE TO RELATED APPLICATION

This application is a continuation-in-part application of U.S. application Ser. No. 17/749,336, filed May 27, 2022, hereby incorporated by reference in its entirety and for all purposes.

TECHNICAL FIELD

This disclosure relates to storing digital information, and more particularly, to client support of multiple fingerprint formats for data file segments.

BACKGROUND

A data object may be a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of the data object and the embedding of these values in a database's data structures) within dedicated backup files. When the data protection administrator decides to reinstate the data object to a previous state, the data protection administrator specifies the desired previous state by identifying a desired time when the data object was in this previous state, and then instructs the backup/restore application to execute a restore operation to restore a copy of the corresponding backup file(s) for that previous state to the data object.

A data user may copy data in a data center to one or more remote sites, which may be in one or more cloud locations, to have copies of data in case of a data center disaster, and/or the data user may copy data from remote sites to a centralized data center. Data storage systems include recording media that retain digital information, have evolved towards scalable designs that can grow with customer demand by adding storage and computation as necessary, and typically store redundant information. For example, when creating a copy of an enterprise's email system data which includes 100 instances of the same 1 Megabyte (MB) data file attachment, a data storage system may store all 100 instances of the same 1 MB data file attachment, inefficiently using 100 MB of storage space to store the same 1 MB data file attachment. Data deduplication can eliminate redundant copies of information, which can improve the utilization of data storage systems and lower capital expenditure by reducing the total amount of recording media required to meet the capacity needs of data storage systems. Continuing the previous example, a data deduplication system stores only one instance of the same 1 MB data file attachment and stores small references to the one stored instance for the 99 subsequent instances.

When being copied from or to a data storage system, a data file or a data object may be divided into data file segments. A data deduplication system can receive data file segments, compare these received data file segments against previously stored data file segments, identify which received data file segments are unique because they have not been previously stored, and store the unique data file segments. When a comparison identifies a received data file segment as a duplicate of a data file segment that has previously been stored as unique, a data deduplication system replaces the duplicate data file segment with a small reference that points to the previously stored data file segment.

A deduplication system typically does not determine whether any such data file segment is a duplicate data file segment or a unique data file segment by directly comparing this data file segment against previously stored data file segments which were previously determined to be unique data file segments. For example, a deduplication system would waste system resources by directly comparing thousands of bytes in each of many data file segments which were formed from a client's data object or data file against thousands of bytes in millions of data file segments which have already been identified and stored as unique data file segments. Instead, a fingerprint, may be generated to uniquely identify each data file segment, such as by applying a SHA-1 hash function to create a unique 20-byte fingerprint for each data file segment. Consequently, a deduplication system can conserve system resources by more efficiently comparing 20-byte fingerprints for each of many data file segments formed from a client's data object or data file against 20-byte fingerprints for millions of data file segments which have already been identified and stored as unique data file segments.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIGS. 5A and 5B are block diagrams illustrating an example method for client support of multiple fingerprint formats for data file segments according to one or more embodiments of the disclosure.

DETAILED DESCRIPTION

Since deduplication has become a common feature in nearly all primary storage systems, a data protection platform has an opportunity to leverage fingerprints generated by a primary storage system for data file segments during a data backup. Instead of using a hash function to generate new fingerprints for each data file segment received from a primary storage system, a data protection platform could use the fingerprints that were already generated by the primary storage system. For many years, data protection platforms such as Data Domain have used the Secure Hash Algorithm-1 (SHA-1) hash function to generate fingerprints for data file segments.

Recent research publications reported that an algorithm can perform an expensive process to generate different buffers of data that, when hashed by the SHA-1 hash function, result in the same SHA-1 hash value. Since a data protection platform can use a checksum value and a data file segment size along with a SHA-1 hash to uniquely identify data file segments during deduplication, hashing different data to generate the same SHA-1 hash value is more of a theoretical problem than an actual problem for data protection platforms. However, some customers of data protection platforms, such as federal sector customers, may perceive that the SHA-1 hash function is not appropriate to use anymore, and therefore require the use of a stronger hash function, such as the Secure Hash Algorithm-2 (SHA-2) hash function. Therefore, a data protection platform may need to simultaneously support at least one alternative fingerprint format for data file segments, other than the current SHA-1-based fingerprint format, for the numerous clients who may share a data protection platform's cluster of nodes.

Figure 1A:
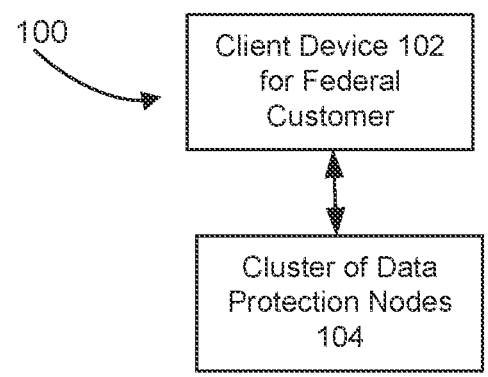
FIG. 1A-D are block diagrams illustrating use cases for client support of multiple fingerprint formats for data file segments according to one or more embodiments of the disclosure.

FIGS. 1A-D depict potential use cases that may require client support of multiple fingerprint formats for data file segments. FIG. 1A depicts a client device 102 used by a customer, such as a federal customer, who mandates that the SHA-1 hash function cannot be used in data protection platforms that they purchased for backing up data to a cluster of data protection nodes 104. The customer may have initially used the SHA-1 hash function and then decided that they need to switch to the SHA-2 hash function, but do not want to delete all their old data and cannot buy a new data protection platform. Consequently, the data protection platform needs to support two fingerprint formats for data file segments until the customer's older data ages out.

Figure 1B:
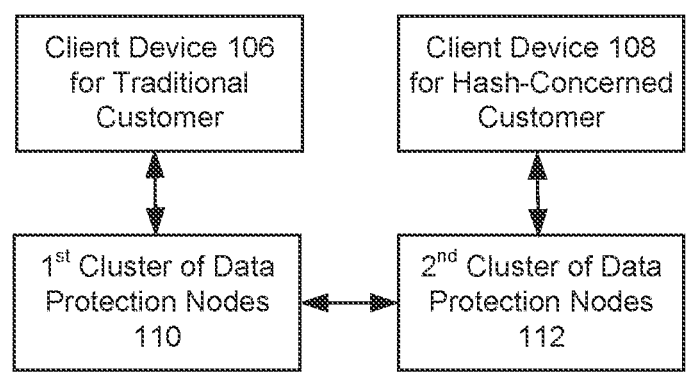

FIG. 1B depicts two client devices 106 and 108 used by two customers. The first customer, who uses the first client device 106, is comfortable with using the SHA-1 hash function, has been storing their data in a first cluster of data protection nodes 110, such as a Data Doman Virtual Edition/Data Doman Restorer, and now wants to replicate their data to a second cluster of data protection nodes 112 for disaster recovery or consolidation reasons. The second customer, who uses the second client device 108, is concerned about using the SHA-1 hash function, requires a stronger hash function, and backs up their data directly to the second cluster of data protection nodes 112 or backs up their data to the second cluster of data protection nodes 112 and then replicates their data to the first cluster of data protection nodes 110. Consequently, the clusters of data protection nodes 110-112 receive backup data that has different requirements for fingerprint formats for data file segments. While FIG. 1B depicts two client devices 106 and 108 used by two customers, the customers could be the same overall customer but different divisions of the same company or different sets of data files that require different levels of security protection.

Figure 1C:
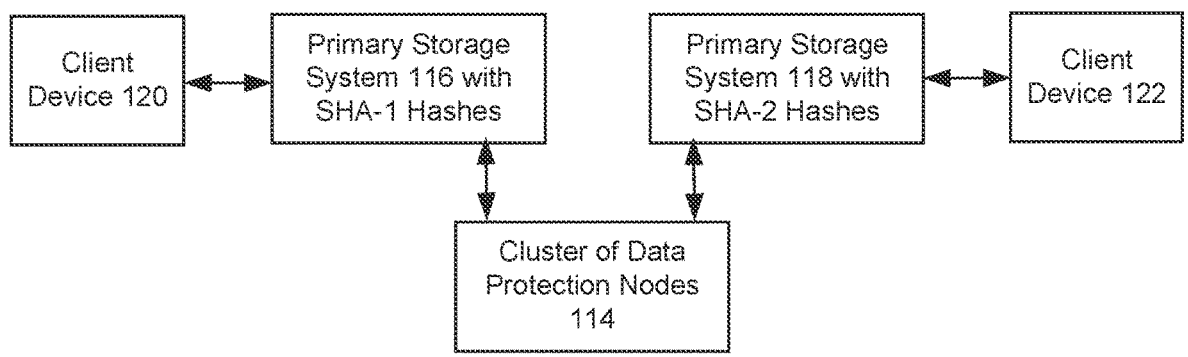

FIG. 1C depicts an example cluster of data protection nodes 114 that focuses on reusing fingerprints already trusted by primary storage systems 116 and 118 used by client devices 120 and 122, respectively. Deduplication has become widely implemented in primary storage systems. Whether a primary storage system deduplicates inline, as a post process step, or applies deduplication to specific tiers or subsets of their data, the data protection platform should leverage those existing fingerprints, when possible, instead of regenerating fingerprints. The primary storage systems 116 and 118 trust their fingerprints to uniquely identify their data, so the cluster of data protection nodes 114 can use those fingerprints directly, but may need to enforce constraints on the fingerprint formats for data file segments which are supported, add additional checks for data invulnerability architecture, and be configured for additional complexities to support customer-provided fingerprint formats for data file segments.

Figure 1D:
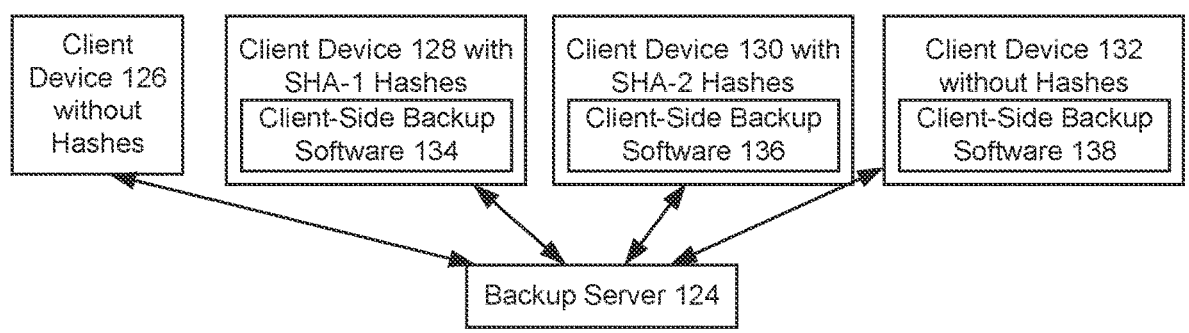

The following examples of client support of multiple fingerprint formats for data file segments are based on FIG. 1D, which depicts one data protection node 124, which may be referred to as the backup server 124, which backs up data for four client devices 126, 128, 130, and 132, which may be referred to as clients 126, 128, 130, and 132, which may be used by four customers. The three client devices 128, 130, and 132 execute three instances of client-side backup software 134, 136, and 138, respectively, which may be referred to as backup/restore applications, 134, 136, and 138, or backup applications, 134, 136, and 138.

In some embodiments, a system (and a computer program product and a method) is described for client support of multiple fingerprint formats for data file segments. If a client is configured to create fingerprints for data file segments, then the configured client identifies any format specified for fingerprints created by the configured client, and identifies fingerprint formats, including a first fingerprint format and/or a second fingerprint format, supported by a backup server associated with the configured client. If the fingerprint formats supported by the backup server includes any format specified for fingerprints created by the configured client, then the configured client partitions the backup server to store fingerprints created by the configured client. The configured client creates fingerprints for segments of a data file identified for backup, and sends the created fingerprints to the partitioned backup server. The configured client identifies a request from the partitioned backup server for a segment, of the data file, which corresponds to a non-duplicate fingerprint; and sends the requested segment to the partitioned backup server, which stores the requested segment.

For example, if the client device 128 is configured to create fingerprints for data file segments, the configured client device 128 configures the use of the SHA-1 fingerprint format to create its own fingerprints, and determines whether the backup server 124 supports the SHA-1 fingerprint format and/or the SHA-2 fingerprint format used for storing clients' fingerprints. If the backup server 124 supports the SHA-1 fingerprint format that the configured client device 128 will use to create fingerprints, the configured client device 128 partitions the backup server 124 to store the configured client's SHA-1 fingerprints. The configured client device 128 creates SHA-1 fingerprints for segments of a SQL data file which is being backed up to the partitioned backup server 124, and sends the SHA-1 fingerprints to the partitioned backup server 124. After the partitioned backup server 124 deduplicates the SHA-1 fingerprints for segments of the SQL data file, the configured client device 128 receives a request from the partitioned backup server 124 to provide the SQL data file segments numbered 2-7, 11-13, and 17-19, which correspond to the SHA-1 fingerprints numbered 2-7, 11-13, and 17-19 which the partitioned backup server 124 identified as non-duplicate fingerprints.

The configured client device 128 sends the requested SQL data file segments numbered 2-7, 11-13, and 17-19, to the partitioned backup server 124, which stores the requested SQL data file segments numbered 2-7, 11-13, and 17-19.

In another example, since the client device 126 without hashes is not configured to create fingerprints for data file segments, and since the client device 126 does not have an available backup application to create fingerprints, the client device 126 configures the backup server 124 to create fingerprints for the client's data file segments which are being backed up to the backup server 124. Since the client device 126 determines that the configured backup server 124 supports both the SHA-1 fingerprint format and the SHA-2 fingerprint format for storing clients' fingerprints, the client device 126 configured the backup server 124 to use the SHA-1 fingerprint format when creating fingerprints for the client's data file segments which are backed up to the configured backup server 124. Then the client device 126 sends segments of a SQL data file which is being backed up to the configured backup server 124, which enables the configured backup server 124 to create SHA-1 fingerprints for the client's SQL data file segments, deduplicate the created SHA-1 fingerprints and determine that the SHA-1 fingerprints numbered 2-7, 11-13, and 17-19 are non-duplicate fingerprints. This enables the configured backup server 124 to identify the SQL data file segments numbered 2-7, 11-13, and 17-19, which correspond to the non-duplicate SHA-1 fingerprints numbered 2-7, 11-13, and 17-19, and store the identified SQL data file segments numbered 2-7, 11-13, and 17-19 in the configured backup server 124.

In yet another example, FIG. 1D depicts a client device 130 used by a customer, such as a federal customer, who mandates that the SHA-1 hash function cannot be used in data protection platforms that they purchased for backing up data to a cluster of data protection nodes, which includes the backup server 124. The customer may have initially used the SHA-1 hash function and then decided that they need to switch to the SHA-2 hash function, but do not want to delete all their old data, and cannot buy a new data protection platform. Consequently, the data protection platform needs to support two fingerprint formats for data file segments until the customer's older data ages out.

Since the client device 130 is configured to create fingerprints for data file segments, the configured client device 130 identifies the SHA-2 fingerprint format that the configured client device 130 will use to create fingerprints. Since the configured client device 130 determines that the backup server 124 supports the SHA-1 fingerprint format and the SHA-2 fingerprint format, which includes the SHA-2 fingerprint format used by the configured client device 130 to create fingerprints for data file segments, the configured client device 130 partitions the backup server 124 to store the SHA-2 fingerprints created by the configured client device 130. Then the configured client device 130 creates SHA-2 fingerprints for segments of a SQL data file which is being backed up to the partitioned backup server 124, and sends the SHA-2 fingerprints to the partitioned backup server 124, which deduplicates the SHA-2 fingerprints. Consequently, the configured client device 130 receives a request from the partitioned backup server 124 to provide the SQL data file segments numbered 2-7, 11-13, and 17-19, which correspond to the SHA-2 fingerprints numbered 2-7, 11-13, and 17-19 which the partitioned backup server 124 identified as non-duplicate fingerprints. The configured client device 130 sends the requested SQL data file segments numbered 2-7, 11-13, and 17-19, to the partitioned backup server 124, which stores the requested SQL data file segments numbered 2-7, 11-13, and 17-19.

In an additional example, a customer who uses the client device 132 without any hashes, had been comfortable with using the SHA-1 hash function, became concerned about using the SHA-1 hash function, required a stronger hash function, and decided to switch to the SHA-2 hash function. Since the client device 132 without any hashes is not configured to create fingerprints for data file segments, the client device 132 determines whether any client-side backup software is available to create fingerprints for data file segments. Since the client-side backup software 138 is available to create fingerprints for data file segments, the client device 132 identifies which format(s) may be specified for fingerprints created by the available client-side backup software 138. Since the client device 132 determines that the SHA-1 and SHA-2 fingerprint formats supported by the backup server 124 includes the SHA-2 fingerprint format that the available client-side backup software 138 uses to create fingerprints, the client device 132 configures the available client-side backup software 138 to create SHA-2 fingerprints for data file segments to be backed up to the backup server 124. Then the client device 132 sends segments of a SQL data file, which is to be backed up to the backup server 124, to the configured client-side backup software 138, which creates SHA-2 fingerprints for segments of the SQL data file to be backed up to the backup server 124. Then the configured client-side backup software 138 sends the created SHA-2 fingerprints to the backup server 124, and receives a request from the backup server 124 to provide the SQL data file segments numbered 2-7, 11-13, and 17-19, which correspond to the non-duplicate SHA-2 fingerprints numbered 2-7, 11-13, and 17-19 identified by the backup server 124. The configured client-side backup software 138 sends the requested SQL data file segments numbered 2-7, 11-13, and 17-19, to the backup server 124, which stores the requested SQL data file segments numbered 2-7, 11-13, and 17-19.

While FIG. 1B depicts two different client devices 106 and 108 used by two different customers, FIG. 1C depicts two different client devices 120 and 122 used by two different customers, and FIG. 1D depicts four different client devices 126, 128, 130, and 132 used by four different customers, some of the customers could be the same overall customer but different divisions of the same company, such that some of these closely-related customers have different sets of data files that require different levels of security protection. Although in FIGS. 1A-D, the cluster of data protection nodes 104, the first cluster of data protection nodes 110, the second cluster of data protection nodes 112, and the cluster of data protection nodes 114 focus on reusing fingerprints already trusted by primary storage systems, and are described as clusters of nodes, the functionality of each of the clusters of nodes 104, 110, 112, and 114 may be implemented by a single node, such as the backup server 124. Any of the client-side backup software 134-138 may be implemented as backup/restore applications 134-138. In some embodiments, a client-side backup software and a backup server are independent parts of separate systems, while in other embodiments, the client-side backup software communicates with the backup server as dependent parts of a common system, such as a Data Domain Boost client accessing the backup objects stored on Data Domain Restorer nodes. Although the following paragraphs describe Dell Corporation's PowerProtect® backup/restore application, Dell Corporation's NetWorker® backup/restore application, and Dell Corporation's Avamar® backup/restore application as examples of a backup/restore applications 134-138, any of the backup/restore applications 134-138 may be any other type of backup/restore application which provides the backup/restore functionalities described in the Background section.

Any of the backup/restore application applications 134-138 may be a Dell Corporation's PowerProtect® Data Manager backup/restore application, which supports Microsoft SQL/Exchange/DB2/Oracle/SAP Oracle/SAP HANA/Filesystem/Hadoop and ProtectPoint solutions, as well as Kubernetes containers and virtual environments. Providing more than just access to backups and restore capabilities, PowerProtect® Data Manager provides analytics and reuse for development/testing, leverages the cloud to extend data center capabilities, and protects cloud native applications. PowerProtect® Data Manager's automated orchestration of fail-over, failback, and testing simplifies production disaster recovery scenarios. PowerProtect® Data Manager empowers data and application owners to perform self-service backup and restore operations from native applications directly to Dell protection storage appliances.

When superior performance is crucial, PowerProtect® Data Manager provides a direct path between Dell tier one storage and PowerProtect® Data Domain and/or Data Domain. PowerProtect® Data Manager extends protection to the cloud by tiering backups to cloud storage for long-term retention, thereby maximizing retention and access to backups without impacting on-premises protection storage resources. When tiering is not enough, PowerProtect® Data Manager enables disaster recovery to the public cloud. At the same time, PowerProtect® Data Manager's governance control provides IT with the necessary oversight and governance to ensure compliance, making even the strictest service level objectives obtainable.

Any of the backup/restore applications 134-138 may be a Dell Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft® Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups.

The core NetWorker® software backs up client file systems and operating system environments. Add-on database and application modules provide backup services for products such as Microsoft® Exchange Server. Client backup data may be sent to a remote NetWorker® storage node or stored on a locally attached device using a dedicated storage node. Dell Corporation's NetWorker® modules for Microsoft® applications supports Microsoft® products such as Microsoft® Exchange, Microsoft® Sharepoint, Microsoft® SQL Server, and Microsoft® Hyper-V servers.

Any of the backup/restore applications 134-138 may be Dell Corporation's Avamar® backup/restore application, which provides fast, efficient backup and recovery through a complete software and hardware solution. Equipped with integrated variable-length deduplication technology, Dell Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for an immediate single step restore. The transmission of deduplicated backup sends only changed blocks, reducing network traffic.

Dell Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. Dell Corporation's Avamar® data store features redundant power and networking, redundant array of independent disks, and redundant array of inexpensive nodes technology to provide uninterrupted data accessibility. Periodic checks of data systems ensure recoverability whenever needed. Dell Corporation's Avamar® systems may be deployed in an integrated solution with Dell Corporation's Data Domain® systems for high-speed backup and recovery of specific data types.

Any of the backup/restore applications 134-138 may use different policies for various data protection levels, such as a "gold" policy for VMware® clients, a "platinum" policy for UNIX® clients, and a "silver" policy for Windows® clients. The gold policy can specify to store two backup copies for each VMware® client's application resources onto the first disk for six months, store a primary clone of the backup copies onto the second disk for one year, and store a secondary clone of the backup copies onto a tape for five years. In another example, a policy can provide redundancy by specifying to replicate each full backup copy to three different backups servers, replicate each incremental cumulative backup copy and each incremental differential backup copy to two different backup servers, replicate each archive log backup copy to an additional backup server, and relocate each full backup copy created at the end of the month to cloud tiering for long term retention. Backup copies stored in the cloud tiering have higher costs associated with storing and accessing the data in the backup copies. A policy's start time can specify the start times for creating a backup copy of an application resource, such as 12:00, 13:00, 14:00, and 15:00, for an hourly backup copy, a policy's retention policy can specify the length of time that a backup copy is retained before the backup copy is destroyed, such as a week, a month, or a year, and a policy's destination pool can include the target storage device where backup copies are stored.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment may be included in at least one embodiment of the disclosure. The appearances of the phrase "embodiment" in various places in the specification do not necessarily all refer to the same embodiment.

Any of the client devices can take the form of software, physical machines, or virtual machines, or any combination thereof, though no particular device implementation or configuration is required for any embodiment. Similarly, data protection platform components such as databases, storage servers, storage volumes, storage disks, backup servers, restore servers, backup clients, and restore clients can likewise take the form of software, physical machines, or virtual machines, though no particular component implementation is required for any embodiment. Where virtual machines are employed, a hypervisor or other virtual machine monitor may be employed to create and control the virtual machines.

As used herein, the term "data" is intended to be broad in scope. Accordingly, data may include data objects (or objects), data file segments (or segments) such as may be produced by data stream segmentation processes, data chunks, data blocks, atomic data, emails, data files, contacts, directories, sub-directories, volumes, etc. In some embodiments, the terms "file," "data file," "object," and "data object" may be used interchangeably.

In addition, the term "backup" (or "data backups," "backed-up data," etc.) is intended to be construed broadly and includes, but is not limited to, partial backups, incremental backups, differential backups, full backups, clones, snapshots, any other type of copies of data, and any combination of the foregoing. Any of the foregoing may, or may not, be deduplicated. In addition, the storage of data can employ any suitable storage technique, infrastructure, hardware such as a solid-state drive, and/or a hard disk drive, or virtual storage systems provided by a cloud service provider.

Exemplary Environments

A client, such as any of the client devices 102, 106, 108, 120, 122, 126, 128, 130, and 132, may execute, or otherwise be associated with, one or more instances of each of one or more applications, and may be associated with a customer of a data backup and protection service. For example, a client may provide computing resources (such as databases) for users (such as website visitors) of a data protection service provider's customer, and data which may be protected by and restored by executing the data protection service provider's backup application, and may include a primary storage system to store client data, as well as an interface for communicating with other systems and devices. While example applications may include database applications such as a SQL Server, data file systems, as well as other types of data stores, the applications executed by any client are not limited to any particular functionality or type of functionality. As further described herein, components of a client (such as client applications and data storage) may be a data source, or be associated with one or more data sources such as a database, a virtual machine, and a storage device.

Figure 2:
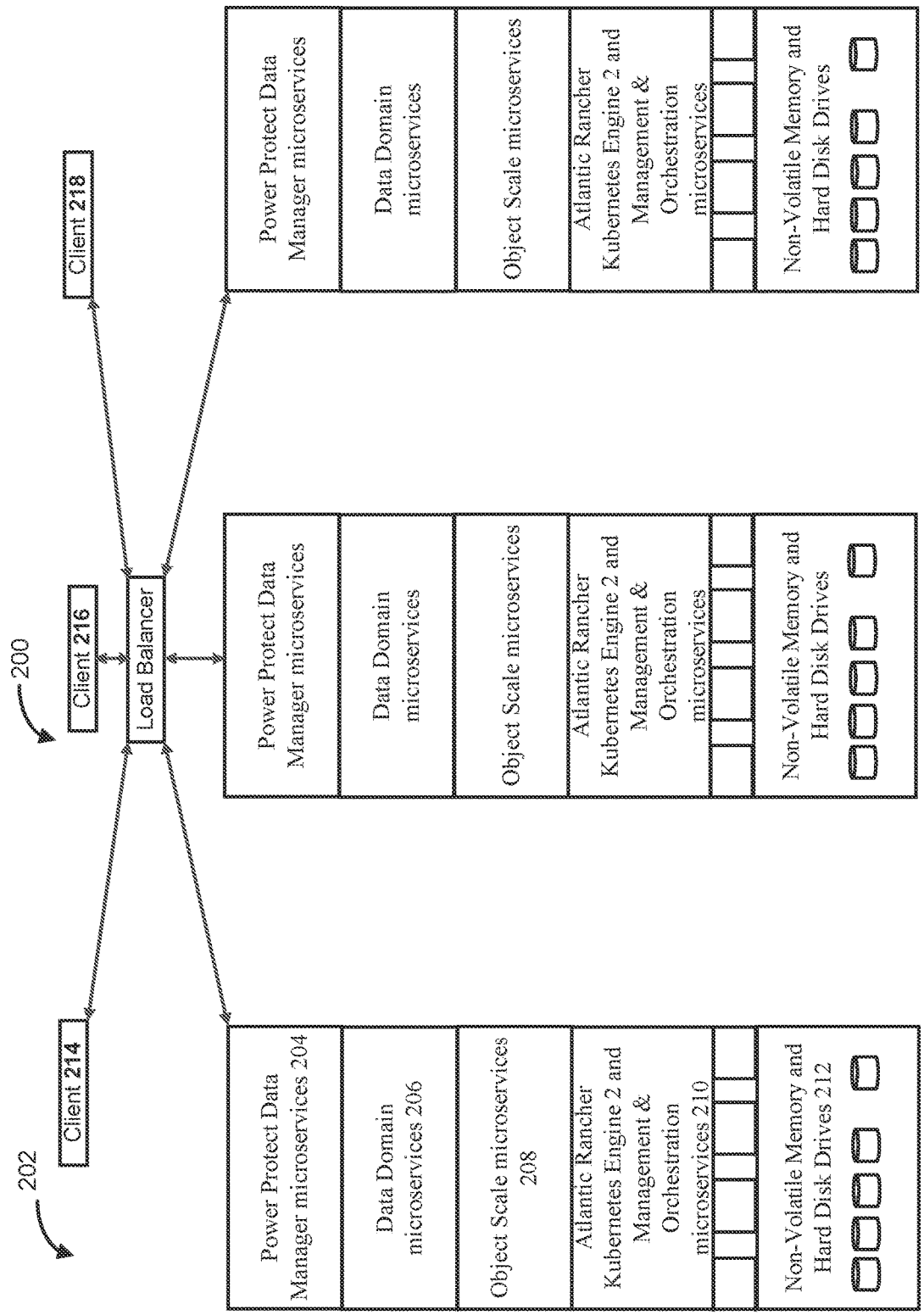
FIG. 2 is a block diagram illustrating parts of an example operating environment for client support of multiple fingerprint formats for data file segments according to one or more embodiments of the disclosure.

An example of parts of a data protection platform's architecture 200 is described herein with reference to FIG. 2. At least some functionality may be provided by, or implemented in connection with, various data protection platforms provided by Dell Technologies, and associated systems, methods, and components, although the use of these particular platforms is provided only by way of illustration and is not required. FIG. 2 depicts a high-level overview of an example three-node cluster architecture for a data protection platform 200. Each node, such as node 202, consists of Power Protect Data Manager microservices 204, Data Domain microservices 206, Object Scale microservices 208, Atlantic Rancher Kubernetes Engine 2, Management & Orchestration microservices 210, and Non-Volatile Memory and Hard Disk Drives 212 to serve the clients 214-218. As more nodes are added, the data protection platform 200 scales Central Processing Units (CPU), Random Access Memory (RAM), storage, and networking accordingly.

Figure 3:
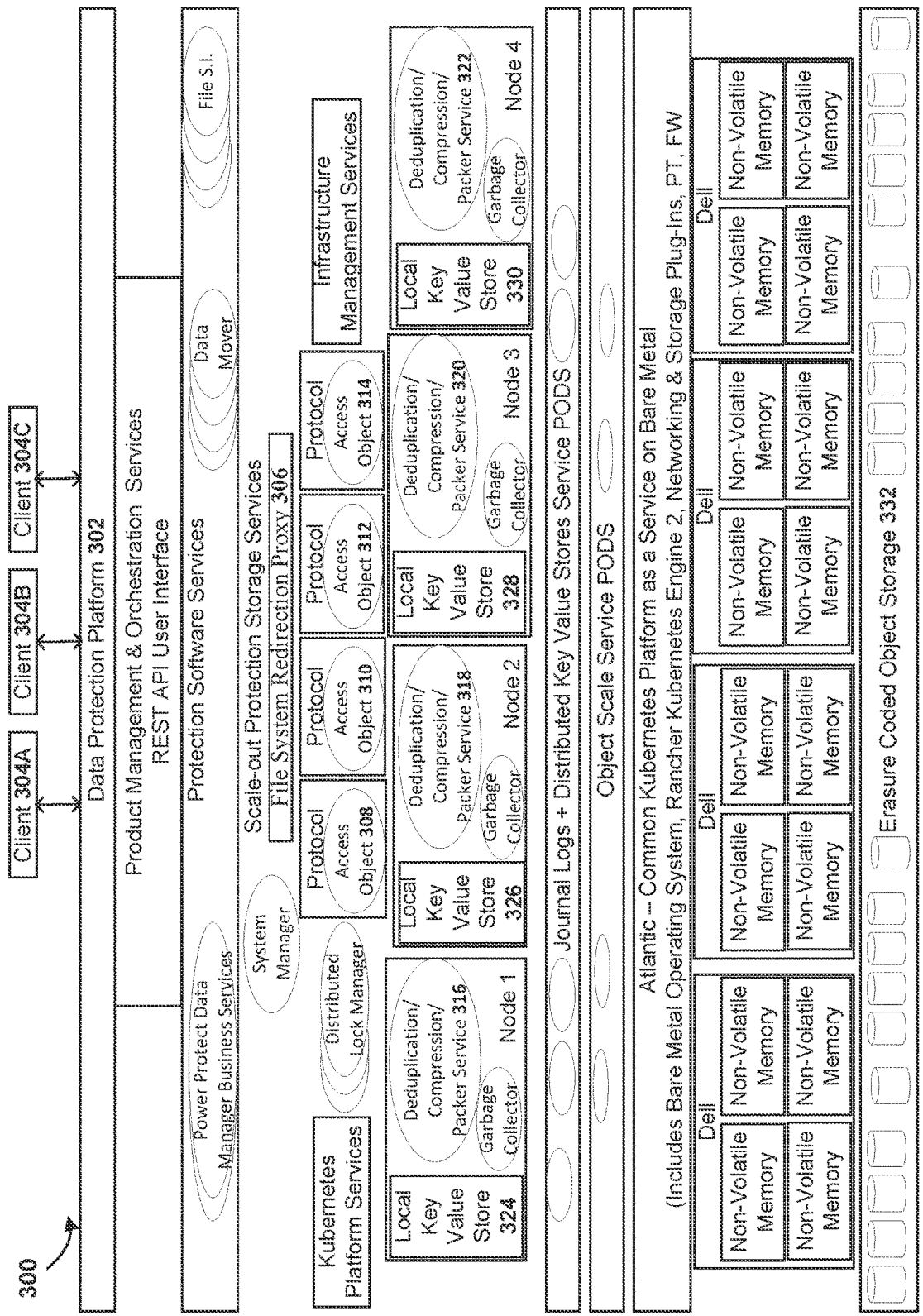
FIG. 3 is a block diagram illustrating an example operating environment for client support of multiple fingerprint formats for data file segments according to one or more embodiments of the disclosure.

FIG. 3 depicts integrated system architecture 300 for a data protection platform 302, which includes details of the microservices related to the data path for supporting multiple fingerprint formats for data file segments within a clustered storage system, which uses a Power Protect Data Manager to provide backup software functionality, according to one or more embodiments of the disclosure. A clustered storage system, as further described herein, may store backup data (backup data files or backup objects) within a one or more nodes, as further described herein, and also store metadata for (or associated with) the backup data, and one or more instances of the data file system that catalogs backup data files and other data residing in the clustered environment. In general, the storage of the backup data may be configured to store data backups for the clients 304 A-C, which may be restored in the event of a loss of data. The clustered storage system may be a data file storage system or an object storage system that includes data file storage or object storage, as further described herein.

The data protection platform 302 may include a File System Redirection Proxy 306 which functions as a load balancer for the clients 304A-C, access object services or micro-services 308-314, deduplication/compression/packer services or micro-services 316-322, local key value stores 324-330, and object storage 332. FIG. 3 depicts the data protection platform 302 with three clients 304A-C, one File System Redirection Proxy 306, four access object services 308-314, four deduplication/compression/packer services or micro-services 316-322, four local key value stores 324-330, and one object storage 332. However, the data protection platform 302 may include any number of the clients 304A-C, the File System Redirection Proxies 306, any number of the access object services 308-314, any number of deduplication/compression/packer services or micro-services 316-322, any number of local key value stores 324-330, and any number of the object storage 332. Each of the deduplication/compression/packer services or micro-services 316-322 may be a single service, or may include a deduplication service, a compression service, and a packer service.

L6 Files or Objects, L1 Segments, & L0 Compression Regions

If any of the clients 304A-C need to generate fingerprints for its data file segments, any one of the clients 304A-C can provide these fingerprints, instead of its data file segments, to the Access Object service 308 for the data protection platform 302. However, if none of the clients 304A-C need to generate fingerprints for its data file segments, any of the clients 304A-C send the data file segments to the Access Object service 308 for the data protection platform 302. If the Access Object service 308 receives fingerprints for data file segments from any of the clients 304A-C, the Access Object service 308 routes these fingerprints to the deduplication/compression/packer service 316 for deduplication.

However, if the Access Object service 308 receives data file segments instead of their fingerprints from any of the clients 304A-C, the Access Object service 308 may generate the fingerprints for the data file segments, and then send these fingerprints to the deduplication/compression/packer service 316.

An advantage of the clients 304A-C or the Access Object service 308 generating fingerprints for data file segments, such that the deduplication/compression/packer service 316 does not have to generate these fingerprints, is a significant reduction in communication volume and time. For example, if any of the clients 304A-C or the Access Object service 308 generates a 20-byte SHA-1 fingerprint for a typical 8,000-byte data file segment, the amount of bytes that any one of the clients 304A-C or the Access Object service 308 has to communicate for the content of this typical data file segment is reduced by 99.75%, from 8,000 bytes to 20 bytes. Consequently, since any one of the clients 304A-C that generate fingerprints for data file segments can significantly reduce the amount of bytes sent to the Access Object service 308 and to the deduplication/compression/packer service 316, embodiments of the disclosure copy data files by configuring sources to generate fingerprints for the data file segments to be copied to a destination, and send these fingerprints to the destination.

Whether the deduplication/compression/packer service 316 newly receives fingerprints for data file segments or newly generates the fingerprints for any received data file segments, the deduplication/compression/packer service 316 compares these new fingerprints against previously generated fingerprints for previously stored data file segments that were previously identified as unique. These comparisons determine which of the new fingerprints are unique, and therefore were generated for data file segments which are unique, and which of the new fingerprints are duplicates, and therefore were generated for data file segments which are duplicates. Upon the identification of any unique fingerprints generated for the data file segments that are unique, the deduplication/compression/packer service 316 can convey the unique fingerprints to the Access Object service 308, which can request the corresponding client 304 A, B, or C which sent the unique fingerprints generated for the data file segments to provide the corresponding unique data file segments. If the Access Object service 308 received data file segments instead of their fingerprints from any of the clients 304A-C, and generated the fingerprints for the data file segments, then the Access Object service 308 can provide the corresponding unique data file segments to the deduplication/compression/packer service 316 instead of requesting the corresponding client 304 A, B, or C to provide the corresponding unique data file segments. Then the unique data file segments may be stored in a compressed format in a compression region by the corresponding client 304 A, B, or C or the Access Object service 308, whichever entity currently retains the data file segments which were just identified as unique data file segments.

Figure 4:
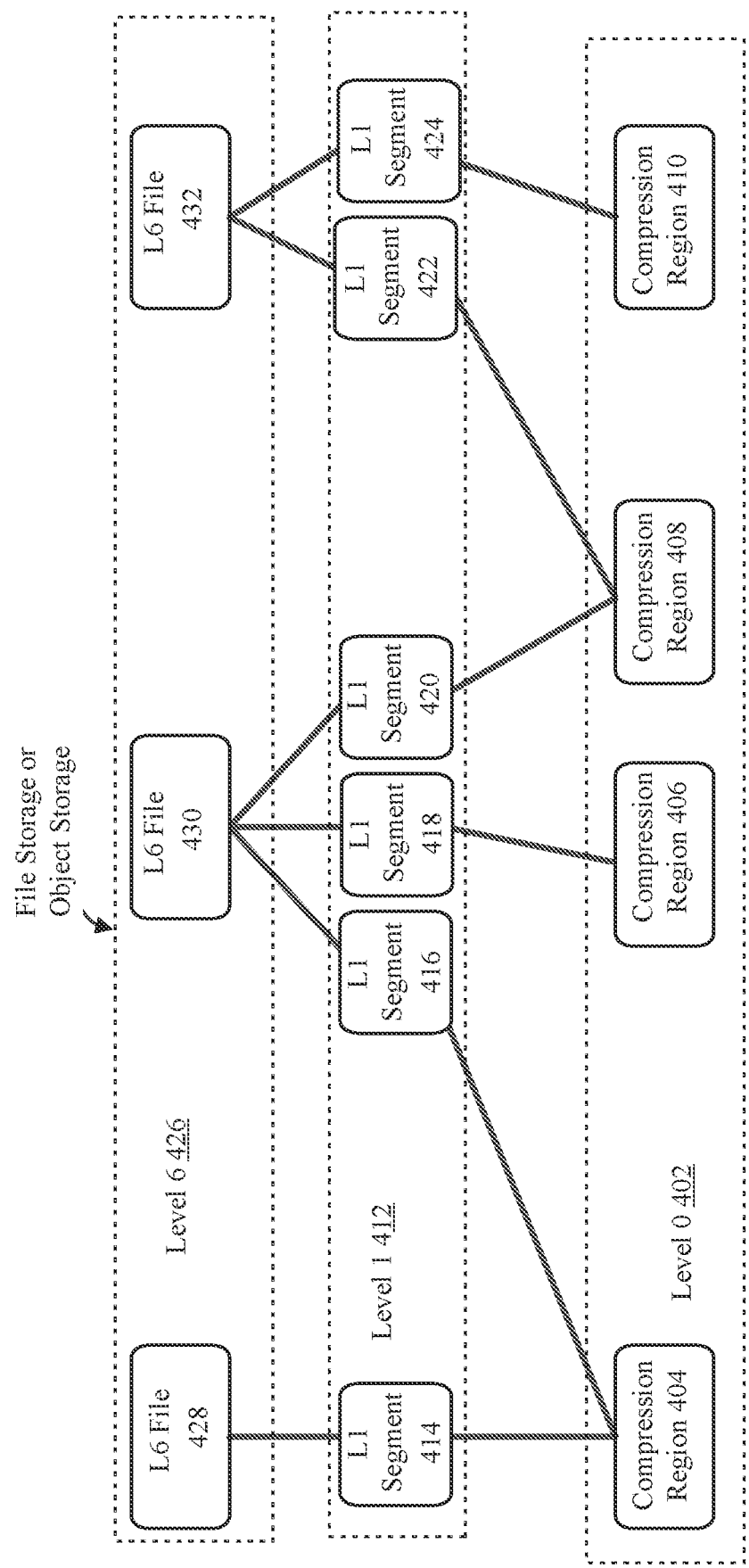
FIG. 4 is a block diagram illustrating relationships between L6 files or objects, L1 segments, and L0 compression regions for client support of multiple fingerprint formats for data file segments according to one or more embodiments of the disclosure.

FIG. 4 depicts that a portion or all of a data file or data object may be represented by a Merkle tree with the bottom level of the Merkle tree representing the data file segments, which may be referred to as level 0 data file segments or Level 0 402 data file segments, which may include compression regions 404-410. Each compression region may store unique data file segments that have been compressed and each compressed data file segment's corresponding unique fingerprint and data file segment size. Large numbers of sequential fingerprints, such as 20-byte SHA-1 fingerprints, generated for sequential data file segments, may be grouped together at the next higher level of the Merkle tree to form groups of fingerprints for data file segments, which may be referred to as a level 1 segment or a L1 segment. Hundreds of the fingerprints, of the groups of data file segments, that form L1 segments, may be grouped together and hashed as level 2 fingerprints or a L2 segment, and this process of grouping and hashing fingerprints for increasingly larger groups of fingerprints may continue up to level 6 or L6, which represents the entire data file or data object.

The top of a Merkle tree is referred to as an L6 file or object, even though it may actually refer to fingerprints for groups of data file segments in a lower numbered level. Fingerprints for segments which are above L0 may be referred to as LP segments, such that the Merkle tree may be referred to as an LP tree. While multiple L0 data file segments may be compressed into 64-kilobyte (KB) to 128 KB sized compression regions, LP segments are not compressed because fingerprints, such as 20-byte SHA-1 fingerprints, are quite random and do not compress well.

FIG. 4 depicts that a portion of data file storage or the object storage may be represented by Level 1 412, which may include L1 segments 414-424. Each L1 segment may store metadata that identifies the data object or data file to which a particular L1 segment belongs, a reference to a similarity group identifier, a fingerprint array that stores those fingerprints included in a L1 segment, and the sizes of each data file segment represented by each fingerprint. FIG. 4 depicts that a portion of data file storage or object storage may be represented by Level 6 426, which may include L6 files 428-432. Each data file or data object has a corresponding L6 file or object, which may reference the one or more L1 segments associated with the data object or data file, since the associated L1 segments are based on an array of fingerprints of the data file segments which comprise the data object or data file.

Deduplication happens when different data files or data objects refer to the same L0 data file segments and LP segments. For example, if two data files are exactly the same, they would have the same L6 fingerprints. However, if two data files only partially overlap in their data, then some branches of the Merkle tree will be identical, with the same LP fingerprints and the same L0 data file segments, while other branches of the Merkle tree will be different, with different LP fingerprints and different L0 data file segments.

For a system with a single node, a L1 segment may be formed based on fixed offsets within data objects or data files, regardless of data file segment boundaries. Since L1 segments are all processed within a single deduplication/compression/packer service 316, such a formation may have little impact on overall deduplication ratios, despite the partial segments which may occur at the ends and the beginnings of the groups of segments that form L1 segments. For a system with multiple deduplication/compression/packer services 316-322, a L1 segment may be formed by evaluating a feature value (such as a hash of the first 64 bytes) of each data file segment for forming the L1 segment until the feature value of one of the data file segments satisfies criteria for forming a group of data file segments, such as by the first data file segment which has a feature value that matches a bit pattern mask. For example, a data file segment which has the feature value that matches the bit pattern mask will serve as a boundary between where the data file segments end for forming the current L1 segment and the data file segments begin for forming the next L1 segment, which typically results in the L1 segments storing fingerprints for groups of data file segments that range from 0.5 MB to 2.0 MB.

Since either a sequence of a data file's segments or a sequence of the data file segments' SHA-1 fingerprints or SHA-2 fingerprints may be used for forming a L1 segment and/or determining a similarity group identifier, a source can send these fingerprints without sending these data file segments when L1 segments are to be formed and similarity group identifiers are to be determined. The feature value for a data file segment for forming a L1 segment (such as a hash of the first 64 bytes of the first data file segment for forming a L1 segment) may be used as the basis for determining a similarity group identifier to route the L1 segment to the appropriate one of the deduplication/compression/packer services 316-322. Using a hash of a representative portion of a data file segment as a similarity group identifier can result in L1 segments for data that are similar, but not identical, being routed to the same one of the deduplication/compression/packer services 316-322 that is uniquely responsible for each L1 segment which has a similarity group identifier that is within a range of similarity group identifiers. The net effect of such routing may be to improve deduplication while increasing skew. The similarity group identifier is checked against a mapping table, which leads to consistently routing the L1 segment based on its similarity group identifier to an instance of the deduplication/compression/packer service.

Using a feature value for the first data file segment for forming a L1 segment has the advantage that it is not necessary to buffer all data file segments for forming a group of data file segments that form a L1 segment before deciding where to route the L1 segment, something that matters when hundreds or thousands of data file segments are being processed simultaneously. Collisions are acceptable when using a hash function for routing L1 segments rather than using a hash function for deduplication, so a system can base a similarity group identifier on the first 32-bit word of a 20-byte SHA-1 fingerprint or the first 64 bytes in the first data file segment in a group of data file segments that form a L1 segment. If a similarity group identifier is in a range of 0 to 1,023, and there are four instances of the deduplication/compression/packer service, these four instances may uniquely be responsible for the similarity group identifiers in the ranges 0 to 255, 256 to 511, 512 to 767, and 768 to 1023, though other mappings are possible. The instance of the deduplication/compression/packer service will use the other fingerprints within the same similarity group to deduplicate the fingerprints which correspond to the L0 segments. Other functionality exists in the deduplication/compression/packer service, such as packing data file segments into compression regions, containers, and blobs that will be written to an underlying object storage such as Object Scale or an object store provided by the public cloud.

For example, in preparation of sending a data file to the data protection platform 302, the data file's source client 304A sends the fingerprints for the L0 data file segments to the data protection platform 302. Based on a hash of the data file handle, path, or other information for the data file being copied, the File System Redirection Proxy 306 selects the Access Object service 308 from the Access Object services 308-314, and routes the traffic to the selected Access Object service 308, in a consistent manner so that future writes and/or reads of the same data file or data object will be routed consistently to the same Access Object service 308. This consistent routing by the File System Redirection Proxy 306 enables the Access Object services 308-314 to cache state in memory that may be reused for recesses and avoids expensive locking.

The selected Access Object service 308 can divide the stream of fingerprints for the data file being copied into L1 segments that correspond to consecutive data file segments, which may be an average of 8 KB in size, depending on system properties because L1 segments are distributed to one of the deduplication/compression/packer services 316-322, which may be on different physical nodes. Since a L1 segment is of a variable size and aligns with a L0 data file segment boundary, the selected Access Object service 308 determines the feature values for the stream of fingerprints and then uses the feature values as the basis for forming a L1 segment and determining a similarity group identifier. Then the selected Access Object service 308 uses the similarity group identifier to send fingerprints for the L1 data file segment to the deduplication/compression/packer service 316 of the deduplication/compression/packer services 316-322, which is uniquely responsible for deduplicating L1 segments that have a similarity group identifier that is in its range of similarity group identifiers. The selected deduplication/compression/packer service 316 also uses the fingerprints for the L0 data file segments to form an LP Merkle tree and update the directory manager for the tree.

If a similarity group identifier of 127 is determined for a L1 segment, then the selected Access Object service 308 routes the L1 segment to the selected deduplication/compression/packer service 316, which processes L1 segments that have similarity group identifiers in the range of 0 to 255. In another example, if a similarity group identifier of 383 is determined for a L1 segment, then the selected Access Object service 308 routes the L1 segment to the selected deduplication service 318, which processes L1 segments that have similarity group identifiers in the range of 256 to 511. Consistent routing enables the deduplication/compression/packer services 316-322 to cache state to accelerate the deduplication process and avoid locking.

Achieving high levels of deduplication requires forming L1 segments, determining a similarity group identifier for each L1 segment, and routing each L1 segment to the appropriate deduplication/compression/packer services 316-322 in a consistent manner. After a L1 segment is formed from the fingerprints for a data object or data file, future data objects or data files should have the same L1 segment boundaries in areas that are unmodified in the data objects or data files so that duplicate data file segments may be identified. Since deduplication of L1 segments may reduce metadata overheads, forming L1 segments consistently also supports L1 segment deduplication.

There are several guiding principles when forming a L1 segment and determining a similarity group identifier. L1 segments should be formed from the fingerprints for the content of data objects or data files so that the formation is consistent for each data object or data file. L1 segments should store fingerprints for groups of data file segments that have a size which ranges from a minimum size to a maximum size. A similarity group identifier should be determined for a L1 segment so that the determination is consistent for each L1 segment. The L1 segment formation and similarity group identifier determination should have low computational costs.

For any of the clients 304A-C or the primary storage systems that send fingerprints for their data file segments instead of sending the data file segments, none of the access object services 308-314 have to generate the fingerprints required for the data file segments because each of the access object services 308-314 already has access to client-generated fingerprints based on the 20-byte SHA-1 fingerprints of each data file segment or the 28+ bytes SHA-2 fingerprints of each data file segment. Any of the access object services 308-314 can use a fingerprint which has already been generated by any of the clients 304A-C for each data file segment as the basis for forming L1 segments from fingerprints for groups of data file segments and as the basis for determining a similarity group identifier for each L1 segment.

The data protection platform 302 provides users with options to configure the fingerprint format for new writes, such as options to configure the fingerprint format per storage tier, for the entire system, per Merkle tree, in the L6 segment or at other places at the top of the data file hierarchy, per collection partition, or other levels of granularity, and options to upgrade fingerprints from the SHA-1 fingerprint format to the SHA-2 fingerprint format. The data protection platform 302 maintains the fingerprint configuration through the write path as a data file is written to generate fingerprints of the specified fingerprint format for data file segments. As an example, if the data protection platform 302 uses the SHA-1 hash function to create SHA-1 hash value fingerprints which are stored on the first data storage tier, and then a user of the data protection platform 302 uses the client 304A to select a reconfiguration option to use the SHA-2 hash function to create SHA-2 hash value fingerprints which are stored on a second data storage tier, there will be many data files already in the data protection platform's cluster of nodes that have SHA-1 hash value fingerprints.

The data protection platform 302 configures one of the deduplication/compression/packer services 316-322 to write new data files to the second data storage tier, to specify the new fingerprint format for the new data files, to generate SHA-2 hash value fingerprints, to use the SHA-2 hash value fingerprints to build a data file's LP tree, and to identify duplicate data file segments. The data protection platform 302 can inform a customer who is using the client 304A to select the option to change the fingerprint format for data file segments, about the potential loss of deduplication because the new SHA-2 hash value fingerprints will not duplicate any of the many SHA-1 hash value fingerprints which are already stored. Effectively, the next backup of the client 304A after upgrading to the SHA-2 hash function will act as a generation zero write, which gets little deduplication, but backups after that will achieve the typical deduplication ratios for that dataset.

The data protection platform 302 can support multiple storage tiers, both internal to a cluster of nodes as well as external to the cluster of nodes, such as a cloud tier. Storage tiers may be configured to use faster and more expensive media or slower and less expensive media. A customer's data protection platform administrator can use any of the clients 304A-C to select configurations to create multiple storage tiers for a given media, such as creating storage tiers for different Merkel trees.

After receiving fingerprints from any of the clients 304A-C, a selected one of the deduplication/compression/packer service 316-322 checks each newly received fingerprint against an in-memory fingerprint cache, which currently stores the most recently used fingerprints for the selected one of the deduplication/compression/packer service 316-322. If one of the newly received fingerprints is in the fingerprint cache, the selected one of the deduplication/compression/packer services 316-322 determines that this newly received fingerprint is a duplicate, and therefore the data file segment represented by this newly received fingerprint is also duplicate, so this newly received fingerprint does not need to be stored again in any fingerprint index and the data file segment does not need to be stored again in the object storage 332. The fingerprint cache may store fingerprints that have multiple fingerprint formats for data file segments. Since the SHA-1 fingerprints are 20 bytes and the SHA-2 fingerprints are 28+ bytes, any comparison of a 20-byte SHA-1 fingerprint against a 28+ bytes SHA-2 fingerprint will result in a failure to duplicate, even if the 20-byte SHA-1 fingerprint and the 28+ bytes SHA-2 fingerprint were generated for the same data file segment. In the possible situation that two fingerprints generated by different hash functions are the same size, the data protection platform 302 will enable a user to use any of the clients 304A-C to partition the fingerprint cache by storage tier or tag each entry to avoid comparing fingerprints generated by different hash functions, such as partitioning a fingerprint cache into a first fingerprint cache that stores SHA-1 fingerprints and a second fingerprint cache that stores SHA-2 fingerprints.

The data protection platform 302 can use distributed key value stores to hold metadata, such as a namespace B-tree, a LP tree, a fingerprint index, and container fingerprints. The distributed key value stores run as containers within a cluster of nodes and are stored to low latency media such as flash. The data protection platform 302 leverages the key value store's functionality to support multiple fingerprint formats for data file segments. Whether a fingerprint's format is based on a SHA-1 hash function, a SHA-2 hash function, or another hash function, the data protection platform 302 can insert the fingerprint into and query the fingerprint in the key value store, which means that the platform 302 can simultaneously support data file s with SHA-1 fingerprints and other data files with SHA-2 fingerprints without changes to the fingerprint index.

Any of the deduplication/compression/packer services 316-322 can compare new fingerprints against previously received fingerprints which were previously identified as unique fingerprints, and then determine which of the new fingerprints are unique, and therefore which of the corresponding data file segments are unique. For example, the deduplication/compression/packer service 316 can select one fingerprint from the newly received L1 segment, and then use the selected fingerprint to query the fingerprint index for the similarity group identifiers for the deduplication/compression/packer service 316. The fingerprint index maps from <fp, simgroup>→<location where the data file segment is stored>, wherein the location where the data file segment is stored consists of several numbers such as object ID, compression region offset, and compression region size. The deduplication/compression/packer service 316 can use that location information as a key to another index that has the group of fingerprints stored for the part of the object surrounding the fingerprint. If the result from using the selected fingerprint to query the fingerprint index is a key, then the deduplication/compression/packer service 316 can use the key to retrieve fingerprints previously determined to be unique from the local key value store 324, load these unique fingerprints to an in-memory cache, and compare each of the newly received fingerprints against the unique fingerprints in the cache to identify which newly received fingerprints duplicates any unique fingerprint in the cache.

However, retrieving fingerprints from a key value store 324, which is composed of non-volatile memory and/or object storage which are kept both locally within a node and distributed across other nodes for availability purposes, may be a relatively lengthy process which requires a significant amount of retrieval time. If the time required for retrieving fingerprints from the object storage and/or the non-volatile memory is aggregated for each L1 segment, the process of deduplication may become prohibitively slow. Consequently, the data protection platform 302 may use a throttle parameter to determine when to retrieve the presumptive unique fingerprints from a key value store, such as one retrieval of presumptive unique fingerprints per 1 megabyte of streamed fingerprints. The use of such a throttle parameter would result in using only the fingerprints which remain in the fingerprint cache to evaluate the uniqueness of the recently received fingerprints in the incoming stream of 49 L1 segments, then retrieving fingerprints from a key value store to evaluate the uniqueness of the streamed fingerprints that are in the $50^{th}$ L1 segment. The throttle parameter may be increased or decreased by a system administrator to balance the time required by the deduplication process against the comprehensiveness of the deduplication process.

If the result of using a fingerprint selected from the $50^{th}$ L1 group of 1,000 fingerprints to query the fingerprint index is not a key, then the deduplication/compression/packer service 316 processes the recently received fingerprint as either a non-duplicate fingerprint or as a duplicate fingerprint. If this fingerprint does not duplicate any fingerprint in the fingerprint index, then the probability is that the user had modified significantly more than one data file segment for which fingerprints were generated in the L1 group of 1,000 fingerprints.

Instead of storing the full fingerprints, such as the 20-byte SHA-1 fingerprints, in the fingerprint index which is queried to determine whether a selected fingerprint is a duplicate, the data protection platform 302 may use short versions of the fingerprints involved in the deduplication process. For example, the deduplication/compression/packer service 316 can compare the first 8 bytes of a fingerprint received from the stream of fingerprints against the first 8 bytes stored in the fingerprint index for each of the 20-byte SHA-1 fingerprints which were previously determined to be unique fingerprints and which may be stored in object storage 332 or in non-volatile flash memory. Since the data protection platform 302 supports multiple fingerprint formats for data file segments, the platform 302 would also create a short fingerprint index which stores the first 8 bytes of the 28+ bytes SHA-2 fingerprints. Since the data protection platform's key value store is designed to support records of varying sizes, and support the creation of multiple tables, with new tables allocated for storage tiers with different fingerprint formats for data file segments, the platform 302 could convert each key value store into a key value store for 20-byte SHA-1 fingerprints and a key value store for 28+ bytes SHA-2 fingerprints, or a key value store for the first 8 bytes of 20-byte SHA-1 fingerprints and a key value store for the first 8 bytes of 28+ bytes SHA-2 fingerprints. When querying a key value store's fingerprint index for a fingerprint, fingerprints of different lengths will naturally not be a duplicate of each other, which is the most common situation expected for data protection platform users who move from the 20-byte SHA-1 fingerprint to the 28+ bytes SHA-2 fingerprint. If the data protection platform 302 supports multiple hash functions which generate hash values which have an identical size, the platform 302 can enable a user to use any of the clients 304A-C to add a new table for a new storage tier to the key value store for each fingerprint format for data file segments. During the read/write path, the data protection platform 302 will pass the fingerprint format for data file segments through the code so that the appropriate table in the key value store is queried. The expected number of supported fingerprint formats is relatively small, most likely only the SHA-1 and SHA-2 fingerprint formats for data file segments.

Continuing the previous example, the deduplication/compression/packer service 316 sends the L1 segments' non-duplicate fingerprints to the access object service 308, which requests the source to provide the L0 data file segments which correspond to the non-duplicate fingerprints. The source can load the requested data file segments, compress the requested data file segments into compression regions, and send the compression regions to the data protection platform 302. Then the File System Redirection Proxy 306 routes the compression regions for the data file to the same access object service 308 that processed the specific L1's fingerprints, which uses the similarity group identifier to send the compression regions to the same deduplication/compression/packer service 316 which requested the data file segments, which stores the compression regions in a post-deduplication log.

Alternatively, the source could use the similarity group identifier to send the compression regions directly to the appropriate deduplication/compression/packer service 316 instead of bouncing through the File System Redirection Proxy 306 and the access object service 308. The deduplication/compression/packer service 316 reviews the post-deduplication log for recently received compression regions, packs recently received compression regions into containers or large objects, and then stores the containers or the large objects to the underlying object storage 332, which may be a private or public object storage system or other highly-available shared storage system that can scale to the needed size and provide data access even if there are underlying hardware failures. If the source loads and then sends the requested data file segments to the data protection platform 302, without compressing the requested data file segments into compression regions, the File System Redirection Proxy 306 routes the requested data file segments to the same access object service 308 that processed the specific L1's fingerprints, which uses the similarity group identifier to send the requested data file segments to the same deduplication/compression/packer service 316 which requested the data file segments, which will store the requested data file segments, which are judged to be new, into containers, compress the containers, pack the compressed containers into blobs, and write the blobs to the object storage 332.

If a container or a blob had a mixture of fingerprints with the SHA-1 fingerprint format and fingerprints with the SHA-2 fingerprint format, then prefetching the mixture of fingerprints would result in only the fingerprints of one format being useful and the fingerprints of any other format being a waste of cache space. Therefore, all fingerprints in a container or a blob must have the same fingerprint format, thereby avoiding inefficient fingerprint prefetches and Garbage Collection complexities.

The data protection platform 302 provides a user with a selectable option for the platform 302 to directly use client-created fingerprints from any of the clients 304A-C that already stores data in a deduplicated format that is represented by these client-created fingerprints, instead of the platform 302 creating additional fingerprints for the data in the clients 304A-C during backups. Since the clients 304A-C trust the use of the client-created fingerprints for deduplication purposes within the client system, the client system implicitly trusts the use of these client-created fingerprints for external deduplication during backups.

When creating a new backup for any of the clients 304A-C, the data protection platform 302 queries the fingerprint format used by the corresponding client 304A, B, or C, and compares the client's fingerprint format against an approved list of fingerprint formats for data file segments. If the client's fingerprint format is approved, then the data protection platform 302 can use the client-created fingerprints for the data files written to and/or read from the corresponding client 304A, B, or C for constructing the LP tree for a data file, and for at least part of the deduplication data path. The data protection platform 302 adds the client-created fingerprints to a key value store and uses the client-created fingerprints to reference the corresponding L0 segments stored in containers. To be consistent, the data protection platform 302 uses the same fingerprint format for creating the upper LP segments in a data file hierarchy which were used for creating the L0 segments, despite any reasons to use a different fingerprint format that is judged to be sufficiently strong.

The data protection platform 302 supports cross-client deduplication for closely related clients, such as clients backing up virtual machines which are created within the same organization, because the data protection platform 302 can compare these clients' fingerprints which have the same fingerprint format. However, for clients that are not closely related, the data protection platform 302 can use an existing collection partition functionality which separates indexes and containers from other collection partitions so that there is no deduplication across collection partitions.

Figure 5B:
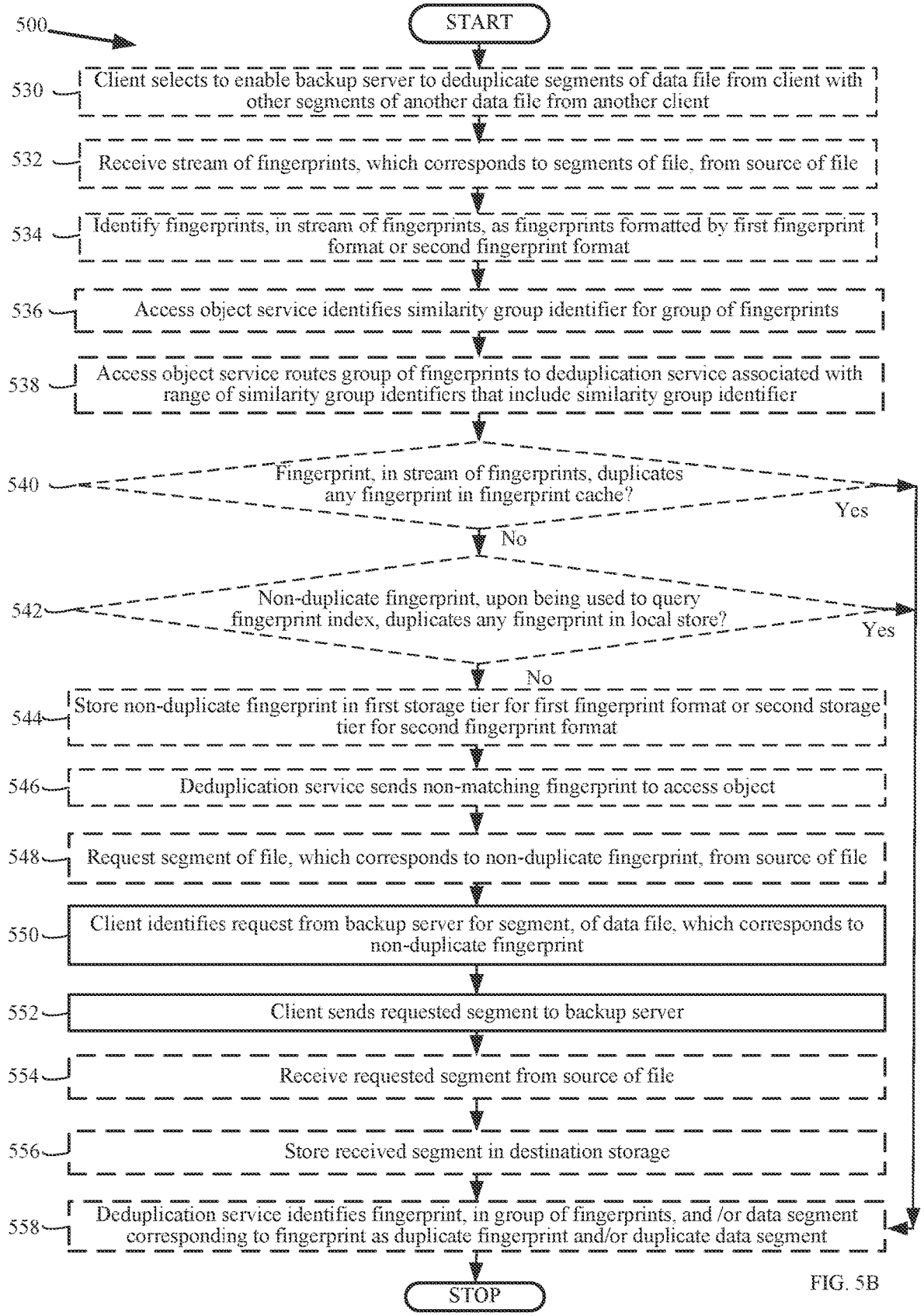

FIGS. 5A and 5B are flowcharts that illustrate a method for supporting multiple fingerprint formats for data file segments, under an embodiment. Flowchart 500 illustrates method acts illustrated as flowchart blocks for certain steps involved in the client 304A, B, or C, and the data protection platform 302 of FIG. 3. FIGS. 5A and 5B depict the flowchart 500 as a method for client support of multiple fingerprint formats for data file segments, with the method acts illustrated as flowchart blocks 502-558.

A determination is made whether a client is configured to create fingerprints for data file segments, block 502. The system determines whether a client can create fingerprints which may be used for deduplication. For example, and without limitation, this can include the client 128 determining whether it can create fingerprints for its SQL data file segments. If a client is configured to create fingerprints for data file segments, the flowchart 500 continues to block 504 to identify the format of the client-created fingerprints. If a client is not configured to create fingerprints for data file segments, the flowchart 500 proceeds to block 516 to determine whether a backup application is available to create fingerprints for data file segments.

A client can be a networked computer that can obtain information and/or applications from a server. A fingerprint can be a bit string which was mapped from a larger data object or data file, and which is generated to uniquely identify the larger data object or data file. A data file segment can be a collection of information stored in a computer's memory or on a storage device under a single identifying name, and which is divided into parts.

If a client is configured to create fingerprints for data file segments, the configured client identifies any format specified for fingerprints created by the configured client, block 504. The system identifies the client-created fingerprints' format. By way of example and without limitation, this can include the configured client 128 identifying the SHA-1 fingerprint format that the configured client 128 will use to create fingerprints. A configured client can be a networked computer that obtains information and/or applications from a server, and that is arranged to be fit for other tasks, such as creating fingerprints for data file segments. A format can be a preestablished layout for data.

Having identified any formats specified for fingerprints to be created by a configured client, the configured client identifies a set of fingerprint formats, including a first fingerprint format and/or a second fingerprint format, supported by a backup server associated with the configured client, block 506. The system identifies fingerprint formats supported by a client's backup server. In embodiments, this can include the configured client 128 identifying that the backup server 124 supports the SHA-1 fingerprint format and the SHA-2 fingerprint format for storing fingerprints for the configured client 128. A set can be a group of any number of things that belong together, resemble one another, or are usually found together. A backup server can be a computer that executes computer programs which assist client devices in storing copies of data objects for retention within dedicated files. A fingerprint format can be a preestablished layout for bit strings which were mapped from larger data objects or data files, and which were generated to uniquely identify the larger data objects or data files.

After identifying a backup server's fingerprint formats, including a first fingerprint format and/or a second fingerprint format, a configured client determines if the set of fingerprint formats supported by the backup server includes any format specified for fingerprints created by the configured client, block 508. The system determines whether a backup server and a client are fingerprint compatible. For example, and without limitation, this can include the client 128 determining that the backup server 124 supports the SHA-1 fingerprint format and the SHA-2 fingerprint format, which includes the SHA-1 fingerprint format used by the configured client 128 to create fingerprints for data file segments.

A determination that the set of fingerprint formats supported by a backup server includes a format specified for fingerprints created by a client may include a determination that the set of fingerprint formats supported by the backup server is associated with a range of sizes of data file segments that includes a size of each data file segment associated with the format specified for fingerprints created by the client. If the primary storage system, such as the client 128, is configured to create fingerprints for data file segments, then not only does the fingerprint format (such as SHA1 or SHA2) used by the client 128 need to be supported by the backup server 124, but the size of a data file segment used by the client 128 to create fingerprints also needs to be supported by the backup server 124. For example, the backup server 124 specifies that the size of the data file segments used to create fingerprints should be between 4 KB and 16 KB, between 2 KB and 10 KB, or between 1 MB and 10 MB. A range can be the variation between upper and lower limits. A size can be the magnitude of a group of information.

In addition to specifying support for a range of sizes of data file segments, the backup server 124 may also support a smaller size of data file segments in special cases. For example, the last data file segment in a data file may be smaller than the configured minimum size of data file segments because it is the small number of remaining bytes left over after the previous data file segment was formed. Therefore, the backup server 124 that supports data file segments which are between 4 KB and 12 KB in size may specify that it can support the occasional data file segment that has a size that is less than the minimum size of 4 KB to handle the ends of data files.

If a primary storage system, such as the client 128, creates fingerprints from data file segments that are too large or small for the backup server 124 to support, then the set of fingerprint formats supported by the backup server 124 does not include any format specified for fingerprints created by the client 128. Therefore, the client 128 will use the backup application 134 (the client-side backup software 134) to create fingerprints, or directly write its backups by sending the segments of a data file identified for backup to the backup server 124, instead of using its own fingerprints created from the data file segments which are an unsupported size.

If a configured client determines that a backup server supports fingerprint formats that include any of the configured client's fingerprints formats, the flowchart 500 continues to block 510 to partition the backup server to store fingerprints created by the client for data file segments. If the configured client determines that the backup server does not support fingerprint formats that include any of the configured client's fingerprints formats, the flowchart 500 continues to block 516 to determine whether a backup application 134 is available to create fingerprints for data file segments.

If a backup server supports fingerprint formats that include any of a configured client's fingerprints formats, the client partitions the backup server to store fingerprints created by the configured client for data file segments, block 510. The system partitions a backup server to store client-generated fingerprints if the backup server and the configured client have compatible fingerprints. By way of example and without limitation, since the backup server 124 supports the SHA-1 fingerprint format and the SHA-2 fingerprint format, which includes the SHA-1 fingerprint format used by the configured client 128 to create fingerprints for data file segments, the configured client 128 partitions the backup server 124 to store the SHA-1 fingerprints created by the configured client 128. A partitioned backup server can be a computer that executes computer programs which are configured to assist client devices in storing copies of data objects for retention within dedicated files.

Following the partitioning of a backup server to store client-created fingerprints for data file segments, the configured client creates fingerprints for the segments of a data file identified for backup to the partitioned backup server, block 512. The system creates fingerprints to deduplicate the backup of a client's data file. In embodiments, this can include the configured client 128 creating SHA-1 fingerprints for segments of a SQL data file which is being backed up to the partitioned backup server 124. A data file can be a collection of information stored in a computer's memory or on a storage device under a single identifying name. A segment can be a part into which a data file is divided. Backup can be the action of creating an extra copy of computer data.

Having created fingerprints for a data file to be backed up, a configured client sends the created fingerprints to a partitioned backup server, block 514. The system sends fingerprints for a data file to be backed up to a partitioned backup server. For example, and without limitation, this can include the configured client 128 sending the SHA-1 fingerprints for the segments of the SQL data file to the partitioned backup server 124. Then the flowchart 500 proceeds to block 530, depicted by FIG. 5B, to give the user of the configured client 128 the option to have the configured client's fingerprints deduplicated with other clients' fingerprints, such as fingerprints created for clients used by employees whose work files are closely related. A created fingerprint can be a generated bit string which was mapped from a larger data object or data file, and which is generated to uniquely identify the larger data object or data file.

If a client is not configured to create fingerprints for data file segments, or if a configured client determines that a backup server's fingerprint formats are not compatible with any of the configured client's fingerprint formats, then the client determines whether a backup application is available to create fingerprints for data file segments, block 516. The system determines whether a backup application can create fingerprints for a client's data file segments, because the client cannot create fingerprints which are compatible with a backup server's fingerprints. By way of example and without limitation, this can include the client 128 determining if the backup application 134 can create fingerprints for the client's SQL data file segments. A backup application can be a program or piece of software designed and written to create an extra copy of computer data.

If a client determines that a backup application is available to create fingerprints for the client's data file segments, then the flowchart 500 continues to block 518 to identify any formats specified for fingerprints created by the available backup application. If the client determines that no backup application is available to create fingerprints for data file segments, then the flowchart 500 proceeds to block 526 to configure a backup server to create fingerprints for data file segments identified for backup to the backup server. An available backup application can be a program or piece of software designed and written to create an extra copy of computer data, and which is ready for use.

Having identified any format specified for fingerprints created by an available backup application, the client optionally determines whether the set of fingerprint formats supported by the backup server includes any format specified for fingerprints created by the available backup application, block 520. The system determines whether a backup server's fingerprint formats are compatible with a backup application's fingerprint format. For example, and without limitation, this can include the client 128 determining whether the backup server 124 supports fingerprint formats that are compatible with fingerprints created by the available backup application 134.

If the set of fingerprint formats supported by a backup server includes any format specified for fingerprints created by an available backup application, the flowchart 500 continues to block 522 to configure the available backup application to create fingerprints for the data file segments which were identified for backup to the backup server. If the set of fingerprint formats supported by the backup server does not include any format specified for fingerprints created by the available backup application, the flowchart 500 proceeds to block 526 to configure the available backup server to create fingerprints for data file segments identified for backup to the backup server.

After determining that a backup server's fingerprint formats are compatible with a backup application's fingerprint format, a client optionally configures the available backup application to create fingerprints for the data file segments which were identified for backup to the backup server, block 522. The system configures an available backup application to create fingerprints for a client's data file segments. By way of example and without limitation, this can include the client 128 configuring the available backup application 134 to create fingerprints for the data file segments in the client 128 which are to be backed up to the backup server 124.

Following the configuring of a backup application to create fingerprints, a client optionally sends segments of a data file, identified for backup to the backup server, to the configured backup application, block 524. The system sends the data file segments to the backup application which will create fingerprints for the client's data file segments. In embodiments, this can include the client 128 sending the SQL data file segments to the backup application 134, which generates fingerprints for the SQL data file segments. A configured backup application can be a program or piece of software designed, written, and arranged to be fit to create an extra copy of computer data. Then the flowchart 500 continues to block 530 in FIG. 5B to provide a system administrator with the option to enable cross-client deduplication.

By sending segments of a data file, which are identified for backup to a backup server 124, to a configured backup application 134, a client optionally enables the configured backup application 134 to create fingerprints for segments of a data file identified for backup to the backup server 124, send the created fingerprints to the backup server 124, receive a request from the backup server 124 for a segment, of the data file, which corresponds to a non-duplicate fingerprint; and send the requested data file segment to the backup server 124, which stores the requested data file segment. A non-duplicate fingerprint can be a bit string which was mapped from a larger data object or data file, which was generated to uniquely identify the larger data object or data file, and which has yet to be identified as a copy of an existing bit string.

If a backup application is not available to create fingerprints for data file segments, or if a backup server's fingerprint formats are not compatible with a backup application's fingerprint format, then a client optionally configures the backup server to create fingerprints for data file segments identified for backup to the backup server, block 526. The system configures a backup server to create fingerprints for data file segments. For example, and without limitation, this can include the client 128 configuring the backup server 124 to create fingerprints for the client's data file segments. When a client configures a backup server to create fingerprints for data file segments identified for backup to the backup server, the client can identify a first fingerprint format or a second fingerprint format for the backup server to use when creating fingerprints for data file segments identified for backup to the backup server. For example, the client 128 configures the backup server 124 to create SHA-1 fingerprints for the client's data file segments. A configured backup server can be a computer that executes computer programs to assist client devices in storing copies of data objects for retention within dedicated files, and which is arranged to be fit to create an extra copy of computer data.

Having configured a backup server to create fingerprints for a client's data file segments, the client optionally sends segments of a data file identified for backup to the configured backup server, block 528. The system sends a data file's segment to the last available option for creating and storing the data file segment's fingerprints. By way of example and without limitation, this can include the client 128 sending the SQL data file segments which are to be backed up to the configured backup server 124, to the configured backup server 124 to create fingerprints and thereby optimize the system's deduplication process.

While selecting any of the options for deduplicating a client's data file segments, the client optionally selects to enable a backup server to deduplicate segments of the data file from the client with other segments of another data file from another client, block 530. The system offers users the option for cross-client deduplication. In embodiments, this can include the client 128 selecting to enable the backup server 124 to deduplicate the client's data file segments with other data file segments from another client 130.

The system 300 may be referred to as a data protection platform, which can include a file system redirection proxy, an access object service, and a deduplication/compression/packer service, or may be implemented by at least one backup server. A client may be referred to as a client device, a source client, or a source.

A system optionally receives a stream of fingerprints, which correspond to segments of a data file, from a source of the data file, block 532. The system receives fingerprints for segments in a data file that is to be copied from a client. For example, and without limitation, this can include the access object service 308 receiving a stream of 20-byte SHA-1 fingerprints for data file segments in a database file which might be copied from the source client 304 to the destination data protection platform 302. In an alternative example, the backup server 124 receives a stream of 20-byte SHA-1 fingerprints for data file segments in a database file which might be copied from the client device 126 with SHA-1 hashes.

A source can be an origin from where a data file is received. A stream of fingerprints can be a series of bit strings which were mapped from larger data objects or data files, and which is generated to uniquely identify the larger data objects or data files, which are made available over time. An access object service can be a component that provides functions for processing data structures used by computers.

A load balancer optionally uses an identifier of a data file to select which instance of an access object service will receive the data file's segments or a stream of fingerprints for the data file's segments. For example, the file system redirection proxy 306 hashes the name of the database file which was divided and hashed to generate the incoming stream of fingerprints, and then uses the resulting data file name hash value to route the stream of fingerprints to the access object service 308, instead of to the access object services 310, 312, or 314. A load balancer can be an entity that distributes a set of tasks over a set of resources, with the aim of making the overall processing of the tasks more efficient. An identifier can be a sequence of characters used to refer to an entity.

After receiving a stream of fingerprints, the system optionally identifies fingerprints in the stream of fingerprints as fingerprints formatted by one of the first fingerprint format and a second fingerprint format, block 534. The system identifies fingerprints which will be processed together. By way of example and without limitation, this can include the access object service 308 identifying an existing group of 20-byte SHA-1 fingerprints numbered 1 to 995 which the client 304 has already created from the stream of fingerprints for the database file. In an alternative example, the access object service 308 generates a group of 20-byte SHA-1 fingerprints numbered 1 to 995 for the database file being copied from the client 304 to the data protection platform 302. In another alternative example, the backup server 124 identifies fingerprints in the stream of fingerprints as 20-byte SHA-1 fingerprints. Any group of fingerprints can be a collection of consecutive portions of bit strings which were mapped from larger data objects or data files, and which is generated to uniquely identify the larger data objects or data files.

Following the identification of a group of fingerprints, an access object service optionally identifies a similarity group identifier for the group of fingerprints, block 536. The system can identify a group identifier to consistently route groups of fingerprints which are similar to each other. In embodiments, this can include the access object service 308 identifying an existing similarity group identifier of 127, for the group of fingerprints numbered 1 to 995, which the client 304 has already created for the group of fingerprints in the database file being copied from the client 304 to the destination data protection platform 302. A similarity group identifier can be a specified number which refers to how much a set of data file segments resembles other sets of data file segments. In an alternative example, the access object service 308 generates a similarity group identifier of 127 for the group of fingerprints numbered 1 to 995, in the database file being copied from the client 304 to the data protection platform 302.

After identifying a group of fingerprints and a similarity group identifier for the group of fingerprints, an access object service optionally routes the group of fingerprints to a deduplication service which is associated with a range of similarity group identifiers that include the similarity group identifier, block 538. The system uses a similarity group identifier to route a group of fingerprints to a deduplication, compression, and packer service that processes similar groups of fingerprints. For example, and without limitation, this can include the access object service 308 using the similarity group identifier of 127 to route the group of fingerprints numbered 1 to 995 as the current L1 segment to be deduplicated by the deduplication/compression/packer service 316, which deduplicates L1 segments with similarity group identifiers in the range of 0 to 255.

In an alternative example, the access object service 308 uses the similarity group identifier of 383 to route the group of fingerprints numbered 996 to 1919 as the next L1 segment to be deduplicated by the deduplication service 318, which deduplicates L1 segments with similarity group identifiers in the range of 256 to 511. A deduplication service can be a component that provides functions for the elimination of redundant information. A range of similarity group identifiers can be a set of numbers between lower and upper limits of a scale which refers to how much sets of data file segments resemble other sets of data file segments.

Following receipt of fingerprints which might be already stored in a fingerprint cache, the system optionally determines whether any fingerprints, in a stream of fingerprints, are stored in the fingerprint cache, block 540. The system determines whether the fingerprints which were most recently stored in a fingerprint cache includes any fingerprints that the system just received in the stream of fingerprints. By way of example and without limitation, this can include the deduplication/compression/packer service 316 determining whether the local fingerprint cache already stores any fingerprints which are in the newly received group of fingerprints numbered 1 to 995 for the current L1 segment. In an alternative example, the backup server 124 determines whether the local fingerprint cache already stores any fingerprints which are in the newly received stream of fingerprints numbered 1 to 995. A fingerprint cache can be relatively high-speed retrieval memory that stores bit strings which were mapped from larger data objects or data files, and which were generated to uniquely identify the larger data objects or data files.

The fingerprint cache may include a first fingerprint cache corresponding to the first fingerprint format and a second fingerprint cache corresponding to the second fingerprint format. For example, the destination data protection platform 302 partitions the fingerprint cache into a first fingerprint cache which stores the most recently used 20-byte SHA-1 fingerprints and a second fingerprint cache which stores the most recently used 28+ bytes SHA-2 fingerprints.

If the system determines that any fingerprint, in a newly received stream of fingerprints does not duplicate any fingerprint in the local fingerprint cache, then the flowchart 500 continues to block 542 to determine whether the non-duplicate fingerprint, upon being used to query a fingerprint index, duplicates any fingerprint in a local store. If the system determines that any fingerprint, in a newly received stream of fingerprints duplicates any fingerprint in the local fingerprint cache, then the flowchart 500 proceeds to block 558 to identify the fingerprint, in the stream of fingerprints, and/or the data file segment corresponding to the fingerprint, as a duplicate fingerprint and/or a duplicate data file segment.

If a fingerprint, in a stream of fingerprints, does not duplicate any fingerprint in a fingerprint cache, then the system optionally determines whether the non-duplicate fingerprint, upon being used to query a fingerprint index, duplicates any fingerprint in a local store, block 542. The system determines whether the fingerprints which were previously indexed as unique include a fingerprint that the system just received from the stream of fingerprints. In embodiments, this can include the deduplication/compression/packer service 316 querying a fingerprint index to identify whether newly received non-duplicate fingerprints numbered 2-7, 11-13, and 17-19, from the group of fingerprints numbered 1 to 995, duplicate any fingerprints in the local key value store. In an alternative example, the backup server 124 queries a fingerprint index to identify whether the newly received non-duplicate fingerprints numbered 2-7, 11-13, and 17-19, from the stream of fingerprints numbered 1 to 995, duplicate any fingerprints in the local key value store. A fingerprint index can be a set of items which contain information about the addresses of bit strings which were mapped from larger data objects or data files, and which were generated to uniquely identify the larger data objects or data files.

Determining whether a non-duplicate fingerprint, upon being used to query a fingerprint index, duplicates any fingerprint in a local store may include determining whether the non-duplicate fingerprint, upon being used to query a first fingerprint index corresponding to the first fingerprint format, duplicates any fingerprint in a local store or determining whether the non-duplicate fingerprint, upon being used to query a second fingerprint index corresponding to the second fingerprint format, duplicates any fingerprint in the local store. For example, the deduplication/compression/packer service 316 queries a fingerprint index for 28+ bytes SHA-2 fingerprints to identify whether a newly received non-duplicate 28+ bytes SHA-2 fingerprint duplicates any fingerprint in a local key value store.

The first fingerprint index corresponding to the first fingerprint format may include a first partial fingerprint index and/or a first full fingerprint index, and the second fingerprint index corresponding to the second fingerprint format may include a second partial fingerprint index and/or a second full fingerprint index. For example, the deduplication/compression/packer service 316 queries a fingerprint index for the first 8 bytes of 28+ bytes SHA-2 fingerprints to identify whether a newly received non-duplicate 28+ bytes SHA-2 fingerprint duplicates any fingerprint in a local key value store. A partial fingerprint index can be a set of incomplete items which contain information about the addresses of bit strings which were mapped from larger data objects or data files, and which were generated to uniquely identify the larger data objects or data files. A full fingerprint index can be a set of complete items which contain information about the addresses of bit strings which were mapped from larger data objects or data files, and which were generated to uniquely identify the larger data objects or data files.

If a non-duplicate fingerprint, upon being used to query a fingerprint index, does not duplicate any fingerprint in a local key value store, then the flowchart 500 continues to block 544 to store the non-duplicate fingerprint with fingerprints that have the same fingerprint format as the non-duplicate fingerprint. If a non-duplicate fingerprint, upon being used to query a fingerprint index, duplicates any fingerprint in a local key value store, then the flowchart 500 proceeds to block 558 to identify the fingerprint, in the stream of fingerprints, and/or the data file segment corresponding to the fingerprint, as a duplicate fingerprint and/or a duplicate data file segment.

If a non-duplicate fingerprint, upon being used to query a fingerprint index, does not duplicate any fingerprint in a local key value store, then the system optionally stores the non-duplicate fingerprint in a first storage tier for a first fingerprint format or in a second storage tier for a second fingerprint format, block 544. The system stores a non-duplicate fingerprint in a storage tier with other fingerprints which have the same fingerprint format as the non-duplicate fingerprint. For example, and without limitation, this can include the deduplication/compression/packer service 316 storing the fingerprints numbered 2-7, 11-13, and 17-19, from the group of fingerprints numbered 1 to 995, in a storage tier for 20-byte SHA-1 fingerprints instead of in a storage tier for 28+ bytes SHA-2 fingerprints. In an alternative example, the backup server 124 stores the fingerprints numbered 2-7, 11-13, and 17-19, from the stream of fingerprints numbered 1 to 995, in a storage tier for 20-byte SHA-1 fingerprints instead of in a storage tier for 28+ bytes SHA-2 fingerprints. A storage tier can be a hierarchical level of recording media that retains digital data.

Having stored newly received fingerprints which did not duplicate any fingerprint in a fingerprint cache, a deduplication service optionally sends the non-duplicate fingerprints to an access object service, block 546. The system sends the non-duplicate fingerprints to request their data file segments, which evidently have not been received before. By way of example and without limitation, this can include the deduplication/compression/packer service 316 sending the non-duplicate fingerprints numbered 2-7, 11-13, and 17-19 to the access object service 308.

After receiving the non-duplicate fingerprint, the system optionally requests a data file segment, which corresponds to non-duplicate fingerprint, from the source of the data file, block 548. The system requests the source of a data file to provide the data file segments corresponding to the non-duplicate fingerprints. In embodiments this can include the access object service 308 requesting data file segments numbered 2-7, 11-13, and 17-19, which correspond to the non-duplicate fingerprints numbered 2-7, 11-13, and 17-19, from the client 304A. In an alternative example, the backup server 124 requests data file segments numbered 2-7, 11-13, and 17-19, which correspond to the non-duplicate fingerprints numbered 2-7, 11-13, and 17-19, from the client device 126 with SHA-1 hashes. A request can be an instruction to a computer to provide information or perform another function.

Following a system's request of a data file segment, which corresponds to a non-duplicate fingerprint, from a source of the data file segment, a client identifies a request from a partitioned backup server for a segment, of the data file, which corresponds to the non-duplicate fingerprint, block 550. The system identifies any requests for non-duplicate segments from the source of any data file. For example, and without limitation, this can include the client 128 identifying a request from the partitioned backup server 124 for data file segments numbered 2-7, 11-13, and 17-19, which correspond to the non-duplicate fingerprints numbered 2-7, 11-13, and 17-19.

Having identified a request from a partitioned backup server for a segment, of a data file, which corresponds to a non-duplicate fingerprint, a client sends the requested segment to the partitioned backup server, block 552. The system sends the non-duplicate segments of data files to be stored by the partitioned backup server. By way of example and without limitation, this can include the client 128 sending the requested data file segments numbered 2-7, 11-13, and 17-19 to be received and stored by the partitioned backup server 124.

After requesting a source/client to provide a data file segment corresponding to a non-duplicate fingerprint, the system optionally receives the requested data file segment from the source/client of the data file, block 554. The system receives the data file segments corresponding to the fingerprints which were not received before. In embodiments this can include the deduplication/compression/packer service 316 receiving the data file segments numbered 2-7, 11-13, and 17-19, compressed into compression regions, from the access object service 308, which received the data file segments numbered 2-7, 11-13, and 17-19 compressed into compression regions from the client 306. In an alternative example, the backup server 124 receives the data file segments numbered 2-7, 11-13, and 17-19, compressed into compression regions, from the client device 126 with SHA-1 hashes. When received, the requested data file segments may be in a compressed format, which can be a designed structure for the storage of data which is reduced relative to its original size.

Following receipt of requested data file segments from a source/client, the system optionally stores the received data file segments, block 556. The system stores the received data file segments locally, which evidently have not been previously stored locally. For example, and without limitation this can include the deduplication/compression/packer service 316 storing the data file segments numbered 2-7, 11-13, and 17-19 compressed into compression regions in a post-deduplication log. Then the deduplication/compression/packer service 316 reviews the post-deduplication log for recently received compression regions, packs recently received compression regions which include the data file segments numbered 2-7, 11-13, and 17-19 into a container, such as a large object, and then stores the large object to a destination storage, such as the underlying object storage 332, which may be a backup server. In an alternative example, the backup server 124 stores the data file segments numbered 2-7, 11-13, and 17-19.

A packer service can be a component that provides functions for storing a collection of objects. A container can be a data structure that is a collection of objects. A destination storage can be recording media which retains digital information and is associated with where a data file is sent.

If the system determines that a fingerprint, in a newly received stream of fingerprints is already stored in a local fingerprint cache, or the system determines that a fingerprint, upon being used to query a fingerprint index, is already stored in a local store, then the system optionally identifies the fingerprint and/or a data file segment corresponding to the fingerprint as a duplicate fingerprint and/or a duplicate data file segment, block 558. The system identifies a fingerprint and/or a data file segment corresponding to the fingerprint as a duplicate fingerprint and/or a duplicate data file segment. By way of example and without limitation this can include the deduplication/compression/packer service 316 identifying fingerprints and the data file segments corresponding to the fingerprints as duplicate fingerprints and duplicate data file segments. In an alternative example, the backup server 124 identifies fingerprints and the data file segments corresponding to the fingerprints as duplicate fingerprints and duplicate data file segments. A duplicate fingerprint can be a bit string which was mapped from a larger data object or data file, which is generated to uniquely identify the larger data object or data file, and which is identical to a copy of the bit string. A duplicate data file segment can be a collection of information stored in a computer's memory or on a storage device under a single identifying name, which is divided into parts, one of which is identical to another part of another collection of information Although FIGS. 5A and 5B depict the blocks 502-558 occurring in a specific order, the blocks 502-558 may occur in other orders. In other implementations, each of the blocks 502-558 may also be executed concurrently and/or in combination with other blocks and/or some blocks may be divided into a different set of blocks.

Exemplary Computing System

Figure 6:
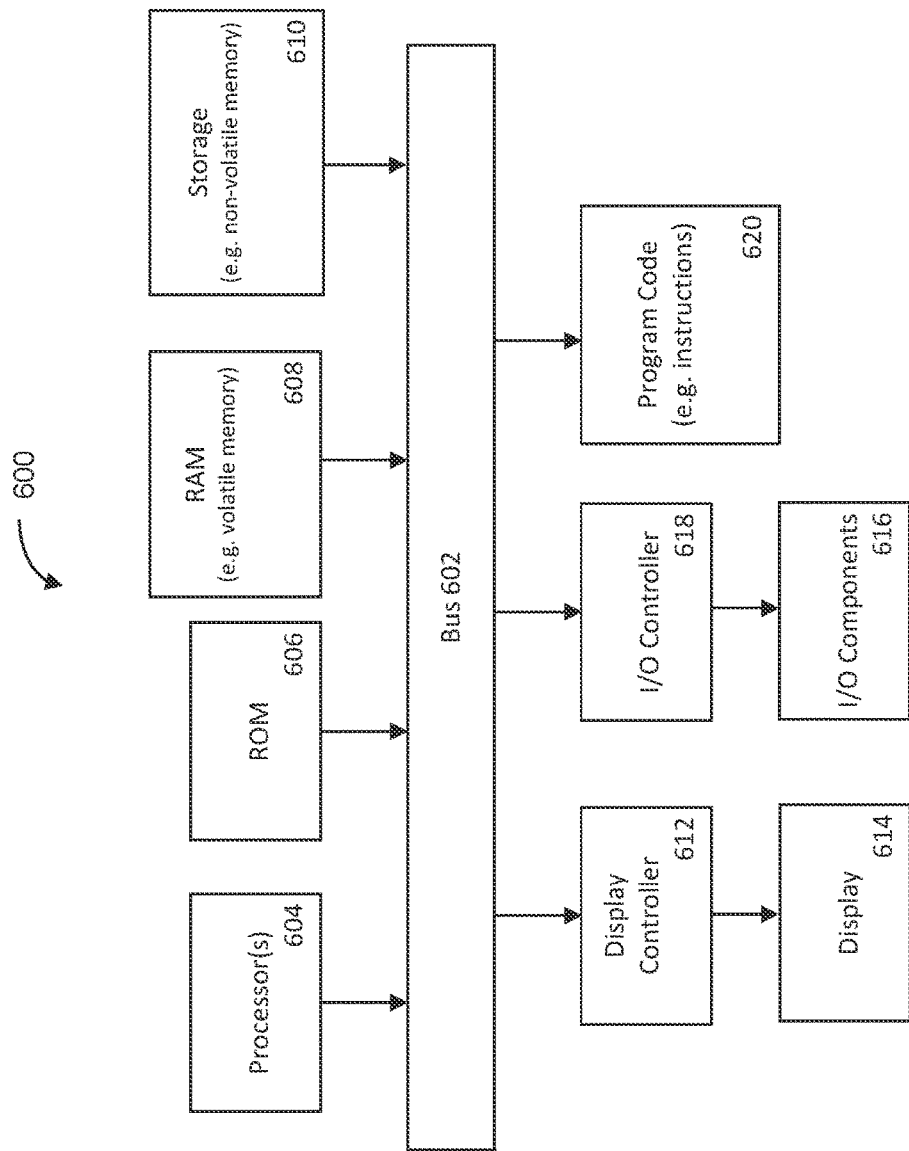
FIG. 6 is a block diagram illustrating a computing system for client support of multiple fingerprint formats for data file segments according to one or more embodiments of the disclosure.

FIG. 6 shows a block diagram of an example of a computing system that may be used in conjunction with one or more embodiments of the disclosure. For example, computing system 600 (or system, or server, or computing device, or device) may represent any of the devices or systems described herein that perform any of the processes, operations, or methods of the disclosure. Note that while the computing system 600 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 600 may include a bus 602 which may be coupled to a processor 604, ROM (Read Only Memory) 606, RAM (or volatile memory) 608, and storage (or non-volatile memory) 610. The processor(s) 604 may retrieve stored instructions from one or more of the memories 606, 608, and 610 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 604 may perform operations in an on-demand or "cloud computing" environment or as a service, such as within a "software as a service" (SaaS) implementation. Accordingly, the performance of operations may be distributed among the one or more processors 604, whether residing only within a single machine or deployed across a number of machines. For example, the one or more processors 604 may be located in a single geographic location (such as within a home environment, an office environment, or a server farm), or may be distributed across a number of geographic locations.

The RAM 608 may be implemented as, for example, dynamic RAM (DRAM), or other types of memory that require power continually in order to refresh or maintain the data in the memory. Storage 610 may include, for example, magnetic, semiconductor, tape, optical, removable, non-removable, and other types of storage that maintain data even after power is removed from the system. It should be appreciated that storage 610 may be remote from the system, such as accessible via a network.

A display controller 612 may be coupled to the bus 602 in order to receive display data to be displayed on a display device 614, which can display any one of the user interface features or embodiments described herein and may be a local or a remote display device. The computing system 600 may also include one or more input/output (I/O) components 616 including mice, keyboards, touch screen, network interfaces, printers, speakers, and other devices. Typically, the input/output components 616 are coupled to the system through an input/output controller 618.

Program code 620 may represent any of the instructions, applications, software, libraries, toolkits, modules, components, engines, units, functions, logic, etc. as described herein. Program code 620 may reside, completely or at least partially, within the memories described herein (such as non-transitory computer-readable media), or within a processor during execution thereof by the computing system. Program code 620 may include both machine code, such as produced by a compiler, and files containing higher-level or intermediate code that may be executed by a computing system or other data processing apparatus (or machine) using an interpreter. In addition, program code 620 may be implemented as software, firmware, or functional circuitry within the computing system, or as combinations thereof. Program code 620 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (such as any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In addition, the use of the term "or" indicates an inclusive or (such as "and/or") unless otherwise specified. For example, the phrase "at least one of x, y, or z" means any one of x, y, and z, as well as any combination thereof. In addition, the term "based on" is used to describe one or more factors that affect a determination.

These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system for client support of multiple fingerprint formats for data file segments comprising:
   one or more processors; and
   a non-transitory computer readable medium storing a plurality of instructions, which when executed, cause the one or more processors to:
   determine, by a client, whether the client is configured to create fingerprints for data file segments;
   identify, by the configured client, any format specified for fingerprints created by the configured client, in response to a determination that the client is configured to create fingerprints for data file segments;
   identify, by the configured client, a set of fingerprint formats, comprising at least one of a first fingerprint format and a second fingerprint format, supported by a backup server associated with the configured client;
   determine, by the configured client, whether the set of fingerprint formats supported by the backup server comprises any format specified for fingerprints created by the configured client;
   request, by the configured client, the backup server to configure to store fingerprints created by the configured client for data file segments, in response to a determination that the set of fingerprint formats supported by the backup server comprises any format specified for fingerprints created by the configured client, wherein the backup server configuring to store fingerprints comprises the backup server arranging to store fingerprints;
   create, by the configured client, fingerprints for segments of a data file identified for backup to the configured backup server;
   send, by the configured client, the created fingerprints to the configured backup server;
   identify, by the configured client, a request from the configured backup server for a segment, of the data file, which corresponds to a non-duplicate fingerprint; and
   send, by the configured client, the requested segment to the configured backup server, which stores the requested segment.

2. The system of claim 1, wherein the first fingerprint format is a SHA-1 fingerprint format and the second fingerprint format is a SHA-2 fingerprint format, and the determination that the set of fingerprint formats supported by the backup server comprises any format specified for fingerprints created by the configured client comprises a determination that the set of fingerprint formats supported by the backup server is associated with a range of sizes of data file segments that includes a size of each data file segment associated with any format specified for fingerprints created by the configured client.

3. The system of claim 1, wherein the plurality of instructions further causes the processor to:
   determine, by the client, whether a backup application is available to create fingerprints for data file segments, in response to one of a determination that the client is not configured to create fingerprints for data file segments and a determination that the set of fingerprint formats supported by the backup server does not comprise any format specified for fingerprints created by the client;
   identify, by the client, any format specified for fingerprints created by an available backup application, in response to a determination that the backup application is available to create fingerprints for data file segments; and
   determine whether the set of fingerprint formats supported by the backup server comprises any format specified for fingerprints created by the available backup application.

4. The system of claim 3, wherein the plurality of instructions further causes the processor to:
   configure, by the client, the available backup application to create fingerprints for data file segments identified for backup to the backup server, in response to a determination that the set of fingerprint formats supported by the backup server comprises any format specified for fingerprints created by the available backup application;
   send, by the client, segments of a data file, identified for backup to the backup server, to the configured backup application, which enables the configured backup application to create fingerprints for segments of a data file identified for backup to the backup server, send the created fingerprints to the backup server, receive a request from the backup server for a segment, of the data file, which corresponds to a non-duplicate fingerprint; and
   send the requested segment to the backup server, which stores the requested segment.

5. The system of claim 3, wherein the plurality of instructions further causes the processor to:
   configure, by the client, the backup server to create fingerprints for data file segments identified for backup to the backup server, in response to a determination that one of no backup application is available to create fingerprints for data file segments and or the set of fingerprint formats supported by the backup server does not comprise any format specified for fingerprints created by the available backup application; and
   send, by the client, segments of a data file identified for backup to the configured backup server, which enables the configured backup server to create fingerprints for the segments of the data file identified for backup to the configured backup server, deduplicate the created fingerprints to determine that a fingerprint of the created fingerprints comprises a non-duplicate fingerprint, identify a data file segment which corresponds to the non-duplicate fingerprint, and store the identified data file segment.

6. The system of claim 5, wherein the client configuring the backup server to create fingerprints for data file segments identified for backup to the backup server comprises the client identifying one of a first fingerprint format and a second fingerprint format for the backup server to use when creating fingerprints for data file segments identified for backup to the backup server.

7. The system of claim 1, wherein the plurality of instructions further causes the processor to select, by the client, to enable the backup server to deduplicate the segments of the data file from the client with other segments of another data file from another client.

8. A computer program product comprising a non-transitory computer-readable medium having a computer-readable program code embodied therein to be executed by one or more processors, the program code including instructions to:
determine, by a client, whether the client is configured to create fingerprints for data file segments;
identify, by the configured client, any format specified for fingerprints created by the configured client, in response to a determination that the client is configured to create fingerprints for data file segments;
identify, by the configured client, a set of fingerprint formats, comprising at least one of a first fingerprint format and a second fingerprint format, supported by a backup server associated with the configured client;
determine, by the configured client, whether the set of fingerprint formats supported by the backup server comprises any format specified for fingerprints created by the configured client;
request, by the configured client, the backup server to configure to store fingerprints created by the configured client for data file segments, in response to a determination that the set of fingerprint formats supported by the backup server comprises any format specified for fingerprints created by the configured client, wherein the backup server configuring to store fingerprints comprises the backup server arranging to store fingerprints;
create, by the configured client, fingerprints for segments of a data file identified for backup to the configured backup server;
send, by the configured client, the created fingerprints to the configured backup server;
identify, by the configured client, a request from the configured backup server for a segment, of the data file, which corresponds to a non-duplicate fingerprint; and
send, by the configured client, the requested segment to the configured backup server, which stores the requested segment.

9. The computer program product of claim 8, wherein the first fingerprint format is a SHA-1 fingerprint format and the second fingerprint format is a SHA-2 fingerprint format, and a determination that the set of fingerprint formats supported by the backup server comprises any format specified for fingerprints created by the configured client comprises a determination that the set of fingerprint formats supported by the backup server is associated with a range of sizes of data file segments that includes a size of each data file segment associated with any format specified for fingerprints created by the configured client.

10. The computer program product of claim 8, wherein the program code includes further instructions to:
determine, by the client, whether a backup application is available to create fingerprints for data file segments, in response to one of a determination that the client is not configured to create fingerprints for data file segments and a determination that the set of fingerprint formats supported by the backup server does not comprise any format specified for fingerprints created by the client;
identify, by the client, any format specified for fingerprints created by an available backup application, in response to a determination that the backup application is available to create fingerprints for data file segments; and
determine whether the set of fingerprint formats supported by the backup server comprises any format specified for fingerprints created by the available backup application.

11. The computer program product of claim 10, wherein the program code includes further instructions to:
configure, by the client, the available backup application to create fingerprints for data file segments identified for backup to the backup server, in response to a determination that the set of fingerprint formats supported by the backup server comprises any format specified for fingerprints created by the available backup application; and
send, by the client, segments of a data file, identified for backup to the backup server, to the configured backup application, which enables the configured backup application to create fingerprints for segments of a data file identified for backup to the backup server, send the created fingerprints to the backup server, receive a request from the backup server for a segment, of the data file, which corresponds to a non-duplicate fingerprint; and
send the requested segment to the backup server, which stores the requested segment.

12. The computer program product of claim 10, wherein the program code includes further instructions to:
configure, by the client, the backup server to create fingerprints for data file segments identified for backup to the backup server, in response to a determination that one of no backup application is available to create fingerprints for data file segments and the set of fingerprint formats supported by the backup server does not comprise any format specified for fingerprints created by the available backup application; and
send, by the client, segments of a data file identified for backup to the configured backup server, which enables the configured backup server to create fingerprints for the segments of the data file identified for backup to the configured backup server, deduplicate the created fingerprints to determine that a fingerprint of the created fingerprints comprises a non-duplicate fingerprint, identify a data file segment which corresponds to the non-duplicate fingerprint, and store the identified data file segment.

13. The computer program product of claim 12, wherein the client configuring the backup server to create fingerprints for data file segments identified for backup to the backup server comprises the client identifying one of a first fingerprint format and a second fingerprint format for the backup server to use when creating fingerprints for data file segments identified for backup to the backup server.

14. The computer program product of claim 8, wherein the program code includes further instructions to select, by the client, to enable the backup server to deduplicate the segments of the data file from the client with other segments of another data file from another client.

15. A computer-implemented method for client support of multiple fingerprint formats for data file segments comprising:
determining, by a client, whether the client is configured to create fingerprints for data file segments;
identifying, by the configured client, any format specified for fingerprints created by the configured client, in response to a determination that the client is configured to create fingerprints for data file segments;

identifying, by the configured client, a set of fingerprint formats, comprising at least one of a first fingerprint format and a second fingerprint format, supported by a backup server associated with the configured client;

determining, by the configured client, whether the set of fingerprint formats supported by the backup server comprises any format specified for fingerprints created by the configured client;

requesting, by the configured client, the backup server to configure to store fingerprints created by the configured client for data file segments, in response to a determination that the set of fingerprint formats supported by the backup server comprises any format specified for fingerprints created by the configured client, wherein the backup server configuring to store fingerprints comprises the backup server arranging to store fingerprints;

creating, by the configured client, fingerprints for segments of a data file identified for backup to the configured backup server, sending, by the configured client, the created fingerprints to the configured partitioned backup server;

identifying, by the configured client, a request from the configured backup server for a segment, of the data file, which corresponds to a non-duplicate fingerprint; and sending, by the configured client, the requested segment to the configured backup server, which stores the requested segment.

16. The computer-implemented method of claim 15, wherein the first fingerprint format is a SHA-1 fingerprint format and the second fingerprint format is a SHA-2 fingerprint format, and a determination that the set of fingerprint formats supported by the backup server comprises any format specified for fingerprints created by the configured client comprises a determination that the set of fingerprint formats supported by the backup server is associated with a range of sizes of data file segments that includes a size of each data file segment associated with any format specified for fingerprints created by the configured client.

17. The computer-implemented method of claim 16, wherein the computer-implemented method further comprises:

configuring, by the client, the available backup application to create fingerprints for data file segments identified for backup to the backup server, in response to a determination that the set of fingerprint formats supported by the backup server comprises any format specified for fingerprints created by the available backup application; and sending, by the client, segments of a data file, identified for backup to the backup server, to the configured backup application, which enables the configured backup application to create fingerprints for segments of a data file identified for backup to the backup server, send the created fingerprints to the backup server, receive a request from the backup server for a segment, of the data file, which corresponds to a non-duplicate fingerprint; and send the requested segment to the backup server, which stores the requested segment.

18. The computer-implemented method of claim 16, wherein the computer-implemented method further comprises:

configuring, by the client, the backup server to create fingerprints for data file segments identified for backup to the backup server, in response to a determination that one of no backup application is available to create fingerprints for data file segments and the set of fingerprint formats supported by the backup server does not comprise any format specified for fingerprints created by the available backup application; and sending by the client, segments of a data file identified for backup to the configured backup server, which enables the configured backup server to create fingerprints for the segments of the data file identified for backup to the configured backup server, deduplicate the created fingerprints to determine that a fingerprint of the created fingerprints comprises a non-duplicate fingerprint, identify a data file segment which corresponds to the non-duplicate fingerprint, and store the identified data file segment, wherein the client configuring the backup server to create fingerprints for data file segments identified for backup to the backup server comprises the client identifying one of a first fingerprint format and a second fingerprint format for the backup server to use when creating fingerprints for data file segments identified for backup to the backup server.

19. The computer-implemented method of claim 15, wherein the computer-implemented method further comprises:

determining, by the client, whether a backup application is available to create fingerprints for data file segments, in response to one of a determination that the client is not configured to create fingerprints for data file segments and a determination that the set of fingerprint formats supported by the backup server does not comprise any format specified for fingerprints created by the client;

identifying, by the client, any format specified for fingerprints created by the available backup application, in response to a determination that the backup application is available to create fingerprints for data file segments; and determining whether the set of fingerprint formats supported by the backup server comprises any format specified for fingerprints created by the available backup application.

20. The computer-implemented method of claim 15, wherein the computer-implemented method further comprises: selecting, by the client, to enable the backup server to deduplicate the segments of the data file from the client with other segments of another data file from another client.

* * * * *